United States Patent
Kim et al.

(10) Patent No.: US 12,373,071 B2
(45) Date of Patent: Jul. 29, 2025

(54) ELECTRONIC DEVICE INCLUDING SENSOR LAYER FOR SENSING INPUTS BY TOUCH AND PEN

(71) Applicant: SAMSUNG DISPLAY CO., LTD., Yongin-si (KR)

(72) Inventors: Gayoung Kim, Yongin-si (KR); Kangwon Lee, Yongin-si (KR); Hyunjee Jeon, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/509,126

(22) Filed: Nov. 14, 2023

(65) Prior Publication Data
US 2024/0248571 A1    Jul. 25, 2024

(30) Foreign Application Priority Data
Jan. 19, 2023  (KR) ........................ 10-2023-0008287

(51) Int. Cl.
*G06F 3/044* (2006.01)
*G06F 3/041* (2006.01)

(52) U.S. Cl.
CPC ........ *G06F 3/0446* (2019.05); *G06F 3/04164* (2019.05); *G06F 2203/04102* (2013.01); *G06F 2203/04111* (2013.01)

(58) Field of Classification Search
CPC ............................ G06F 3/0446; G06F 3/04164
See application file for complete search history.

(56) References Cited

U.S. PATENT DOCUMENTS

| 10,146,336 | B2 | 12/2018 | Lee et al. | |
| 11,231,810 | B2 | 1/2022 | Kim et al. | |
| 11,231,819 | B2 | 1/2022 | Kim et al. | |
| 2009/0213090 | A1* | 8/2009 | Mamba ................ | G06F 3/0446 345/174 |
| 2010/0328228 | A1* | 12/2010 | Elias .................... | G06F 3/0446 178/18.05 |
| 2016/0209952 | A1* | 7/2016 | Lin ....................... | G06F 3/0446 |
| 2018/0224984 | A1 | 8/2018 | Kim et al. | |
| 2019/0064964 | A1* | 2/2019 | Choi ..................... | G06F 3/0443 |

(Continued)

FOREIGN PATENT DOCUMENTS

| KR | 10-2020-0039889 | 4/2020 |
| KR | 10-2021-0003986 | 1/2021 |

(Continued)

OTHER PUBLICATIONS

EP EESR dated Jun. 14, 2024 in corresponding EP Patent Application No. 24152032.9.

*Primary Examiner* — Sanghyuk Park
(74) *Attorney, Agent, or Firm* — F. CHAU & ASSOCIATES, LLC

(57) ABSTRACT

An electronic device for sensing a touch includes a plurality of first electrodes, a plurality of second electrodes, a plurality of third electrodes, a fourth electrode, a first loop trace line, and a trace line. The fourth electrode includes a plurality of sub-electrodes connected in parallel with each other. The first loop trace line is electrically connected to the plurality of third electrodes. The trace line is electrically connected to the fourth electrode and connected to one end of each of the plurality of sub-electrodes.

28 Claims, 24 Drawing Sheets

(56) References Cited

U.S. PATENT DOCUMENTS

2019/0102002 A1    4/2019  Lee et al.
2020/0142563 A1    5/2020  Kim et al.
2022/0147194 A1*   5/2022  Wang .................... G06F 3/0448

FOREIGN PATENT DOCUMENTS

| KR | 10-2022-0110053 | 8/2022 |
| KR | 10-2453868 | 10/2022 |
| WO | 2022169185 | 8/2022 |

* cited by examiner

ELECTRONIC DEVICE INCLUDING SENSOR LAYER FOR SENSING INPUTS BY TOUCH AND PEN

CROSS-REFERENCE TO RELATED APPLICATIONS

This U.S. patent application claims priority under 35 U.S.C. § 119 to Korean Patent Application No. 10-2023-0008287 filed on Jan. 19, 2023, in the Korean Intellectual Property Office, the disclosures of which is incorporated by reference in its entirety herein.

1. Discussion of Related Art

Embodiments of the present disclosure described herein relate to an electronic device that senses an input from a pen.

2. Discussion of Related Art

An electronic device such as a television, a mobile phone, a tablet computer, a navigation device, and a game console include a display device for displaying an image. The electronic device may include a sensor layer (or an input sensor) that senses a touch-based input to enable a user to easily, intuitively, and conveniently input information or a command in addition a button, a keyboard, and a mouse. The sensor layer may sense a touch or a pressure applied using a user's body. There is an increasing demand for the ability to input the information or perform a specific application (e.g., for sketching or drawing) using a pen.

SUMMARY

Embodiments of the present disclosure provide an electronic device capable of sensing an input from a pen.

According to an embodiment, an electronic device for sensing a touch includes a plurality of first electrodes, a plurality of a second electrodes, a plurality of third electrodes, a fourth electrode, a first loop trace line, and a trace line. The plurality of first electrodes are arranged along a first direction and extend along a second direction intersecting the first direction. The plurality of second electrodes are arranged along the second direction and extend along the first direction. The plurality of third electrodes are arranged along the first direction and extend along the second direction. The fourth electrode is arranged along the second direction, extends along the first direction, and includes a plurality of sub-electrodes connected in parallel with each other. The first loop trace line is electrically connected to the plurality of third electrodes. The trace line is electrically connected to the fourth electrode and connected to one end of each of the plurality of sub-electrodes.

In one implementation, each of the plurality of third electrodes may include a plurality of first sub-electrodes connected in parallel with each other.

In one implementation, the number of the plurality of first electrodes may be equal to a product of the number of the plurality of first sub-electrodes included in each of the plurality of third electrodes and the number of the plurality of third electrodes.

In one implementation, the electronic device may further include a second loop trace line including a connection line portion for connecting the plurality of first sub-electrodes to each other.

In one implementation, a first end of each of the plurality of first sub-electrodes may be connected to the second line portion, and a second end spaced apart from the first end of each of the plurality of first sub-electrodes in the second direction may be connected to the connection line portion.

In one implementation, the electronic device may further include a plurality of first trace lines electrically connected to the plurality of first electrodes in a one-to-one correspondence, and a plurality of second trace lines electrically connected to the plurality of second electrodes in a one-to-one correspondence, the second loop trace line may overlap at least one of the plurality of first trace lines.

In one implementation, a first portion of one of the first trace lines and a second portion of the connection line portion of the second loop trace line may overlap each other on a plane, and the first portion and the second portion may be disposed on different layers.

In one implementation, at least a portion of each of the plurality of first trace lines, the plurality of second trace lines, the first loop trace line, and the second loop trace line may have a multi-layer structure.

In one implementation, each of the plurality of first trace lines may include a plurality of branches, and the plurality of branches may be electrically connected to one corresponding first electrode among the plurality of first electrodes.

In one implementation, each of the plurality of first electrodes may extend along the second direction and include a plurality of split electrodes spaced apart from each other in the first direction, and the plurality of branches may be electrically connected to the plurality of split electrodes.

In one implementation, the first loop trace line may include a first line portion extending along the first direction and electrically connected to the plurality of third electrodes, a second line portion extending from a first end of the first line portion along the second direction, and a third line portion extending from a second end of the first line portion along the second direction.

In one implementation, each of a resistance of the second line portion and a resistance of the third line portion may be equal to a resistance of one of the plurality of third electrodes.

In one implementation, the number of the plurality of first electrodes may be greater than the number of the plurality of third electrodes.

In one implementation, the number of the plurality of sub-electrodes may be equal to or smaller than the number of the plurality of second electrodes.

In one implementation, the fourth electrode may be provided in plural to form a plurality of fourth electrodes and the trace line may be provided in plural to form a plurality of trace lines, and each of the plurality of trace lines may be connected to one end of each of the plurality of sub-electrodes included in a corresponding fourth electrode among the plurality of fourth electrodes.

In one implementation, the electronic device may further include a sensor driver circuit electrically connected to the plurality of first electrodes, the plurality of second electrodes, the plurality of third electrodes, and the fourth electrode, in a first mode, the sensor driver circuit may sequentially provide a transmission signal to the plurality of first electrodes, receive a reception signal from the plurality of second electrodes, and measure coordinates of a first input from the reception signal, in a second mode, the sensor driver may provide a current to a coil formed by at least a portion of the first loop trace line and the plurality of third electrodes, and in a third mode, the sensor driver circuit may measure a current flowing to the plurality of first electrodes and the plurality of second electrodes to measure coordinates of a second input.

According to an embodiment, an electronic device for sensing a touch includes a plurality of first electrodes, a plurality of second electrodes, a plurality of third electrodes, a fourth electrode, and a first loop trace line. The plurality of first electrodes are arranged along a first direction and extend along a second direction intersecting the first direction. The plurality of second electrodes are arranged along the second direction and extend along the first direction. The plurality of third electrodes are arranged along the first direction and extend along the second direction. Each of the plurality of third electrodes includes a plurality of first sub-electrodes connected in parallel with each other. The fourth electrode extends along the first direction. The first loop trace line includes a first line portion extending along the first direction and electrically connected to the plurality of third electrodes, a second line portion extending along the second direction from a first end of the first line portion, and a third line portion extending along the second direction from a second end of the first line portion.

In one implementation, each of a resistance of the second line portion and a resistance of the third line portion may be equal to a resistance of one of the plurality of third electrodes.

In one implementation, the electronic device may further include a second loop trace line including a connection line portion for connecting the plurality of first sub-electrodes to each other.

In one implementation, the electronic device may further include a plurality of first trace lines electrically connected to the plurality of first electrodes in a one-to-one correspondence, and a plurality of second trace lines electrically connected to the plurality of second electrodes in a one-to-one correspondence, and the second loop trace line may overlap at least one of the plurality of first trace lines.

In one implementation, a first portion of the at least one first trace line and a second portion of the connection line portion of the second loop trace line may overlap each other on a plane, and the first portion and the second portion may be disposed on different layers.

In one implementation, each of the plurality of first trace lines may include a plurality of branches, and the plurality of branches may be electrically connected to one corresponding first electrode among the plurality of first electrodes.

In one implementation, the electronic device may further include a trace line electrically connected to the fourth electrode, the fourth electrode may include a plurality of second sub-electrodes arranged in the second direction, extending along the first direction, and connected in parallel with each other, and the trace line may be connected to one end of each of the plurality of second sub-electrodes.

In one implementation, the fourth electrode may be provided in plural to form a plurality of fourth electrodes, and the electronic device may further include a plurality of trace lines electrically connected to each of the plurality of fourth electrodes, respectively. The plurality of fourth electrodes may be arranged along the second direction and extend along the first direction, and each of the plurality of fourth electrodes may include a plurality of second sub-electrodes connected in parallel with each other, and each of the plurality of trace lines may be connected to one end of each of the plurality of second sub-electrodes included in a corresponding fourth electrode among the plurality of fourth electrodes.

According to an embodiment, an electronic device for sensing a touch includes a plurality of first electrodes, a plurality of second electrodes, a plurality of third electrodes, a fourth electrode and a first loop trace line. The plurality of first electrodes are arranged along a first direction and extend along a second direction intersecting the first direction. The plurality of second electrodes are arranged along the second direction and extend along the first direction. The plurality of third electrodes are arranged along the first direction and extend along the second direction. The fourth electrode extends along the first direction. The first loop trace line includes a first line portion extending along the first direction and electrically connected to the plurality of third electrodes, a second line portion extending along the second direction from a first end of the first line portion, and a third line portion extending along the second direction from a second end of the first line portion, and each of a resistance of the second line portion and a resistance of the third line portion is equal to a resistance of one of the plurality of third electrodes.

In one implementation, each of the plurality of third electrodes may include a plurality of first sub-electrodes connected in parallel with each other, and the fourth electrode may include a plurality of second sub-electrodes connected in parallel with each other.

In one implementation, the electronic device may further include a second loop trace line including a connection line portion for connecting the plurality of first sub-electrodes to each other.

In one implementation, the electronic device may further include a plurality of first trace lines electrically connected to the plurality of first electrodes in a one-to-one correspondence, and a plurality of second trace lines electrically connected to the plurality of second electrodes in a one-to-one correspondence, and the second loop trace line may overlap at least one of the plurality of first trace lines.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
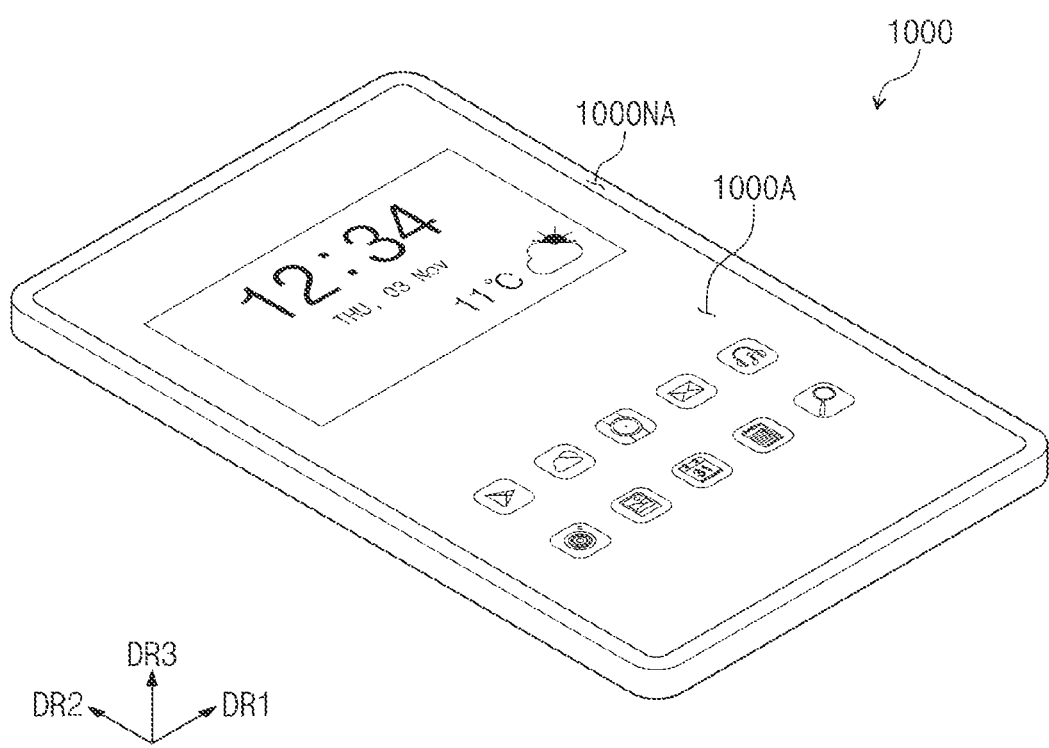
FIG. 1 is a perspective view of an electronic device according to an embodiment of the present disclosure.

In the present document, when a component (or a region, a layer, a portion, and the like) is referred to as being "on", "connected to", or "coupled to" another component, it means that the component may be directly disposed/connected/coupled on another component or a third component may be disposed between the component and another component.

Like reference numerals refer to like components. As used herein, the term "and/or" may include any and all combinations of one or more of the associated components.

Terms such as first, second, and the like may be used to describe various components, but the components should not be limited by the terms. The above terms are used only for the purpose of distinguishing one component from another. For example, without departing from the scope of the present disclosure, a first component may be named as a second component, and similarly, the second component may also be named as the first component. The singular expression includes the plural expression unless the context clearly dictates otherwise.

Hereinafter, embodiments of the present disclosure will be described with reference to drawings.

FIG. 1 is a perspective view of an electronic device 1000 according to an embodiment of the present disclosure.

Referring to FIG. 1, the electronic device 1000 may be a device that is activated in response to an electrical signal. For example, the electronic device 1000 may be a mobile phone, a foldable mobile phone, a laptop computer, a television, a tablet, a vehicle navigation system, a game console, or a wearable device, but is not limited thereto. In FIG. 1, it is illustrated that the electronic device 1000 is the mobile phone as an example.

In the electronic device 1000, an active area 1000A and a peripheral area 1000NA may be defined. The electronic device 1000 may display an image via the active area 1000A. The active area 1000A may include a plane defined by a first direction DR1 and a second direction DR2. The active area 1000A may include one or more pixels to enable the display of the image. The peripheral area 1000NA may surround the active area 1000A. In an embodiment, no pixels are present in the peripheral area. In an embodiment of the present disclosure, the peripheral area 1000NA is omitted.

A thickness direction of the electronic device 1000 may be parallel to a third direction DR3 intersecting the first direction DR1 and the second direction DR2. Accordingly, front surfaces (or top surfaces) and the rear surfaces (or bottom surfaces) of members of the electronic device 1000 may be defined based on the third direction DR3.

Figure 2:
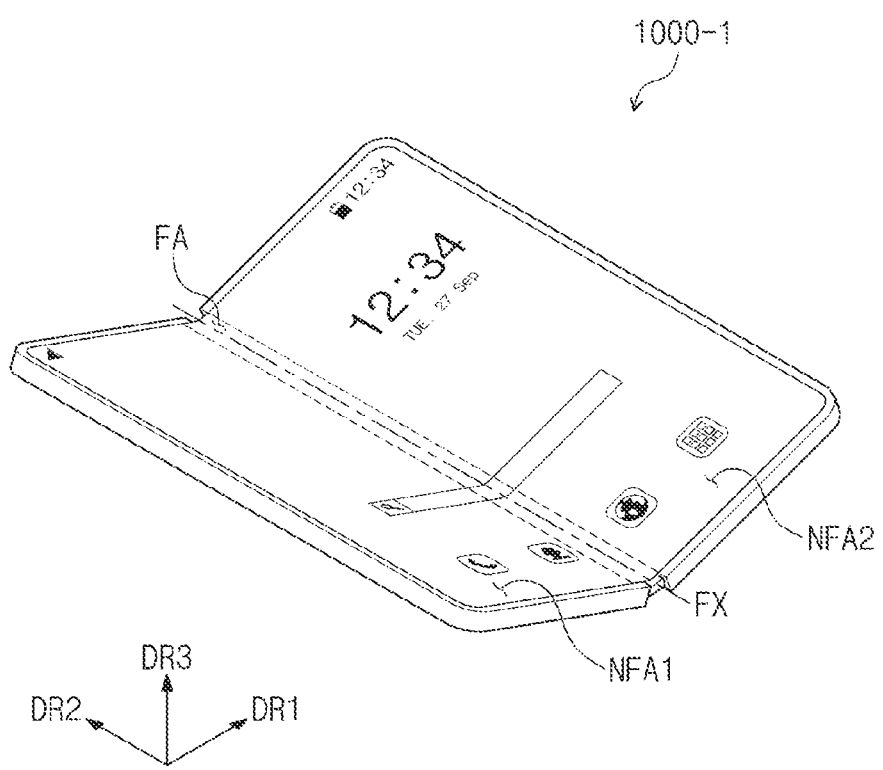
FIG. 2 is a perspective view of an electronic device according to an embodiment of the present disclosure.

FIG. 2 is a perspective view of an electronic device 1000-1 according to an embodiment of the present disclosure.

Referring to FIG. 2, the electronic device 1000-1 may include a folding area FA and a plurality of non-folding areas NFA1 and NFA2. For example, the electronic device 1000-1 may be folded along an imaginary line running through the folding area FA. The non-folding areas NFA1 and NFA2 may include the first non-folding area NFA1 and the second non-folding area NFA2. The folding area FA may be disposed between the first non-folding area NFA1 and the second non-folding area NFA2. The folding area FA may be referred to as a foldable area, and the first and second non-folding areas NFA1 and NFA2 may be referred to as first and second non-foldable areas.

As shown in FIG. 2, the folding area FA may be folded based on a folding axis FX parallel to the second direction DR2. In a state in which the electronic device 1000-1 is folded, the folding area FA has a predetermined curvature and a predetermined radius of curvature. The first non-folding area NFA1 and the second non-folding area NFA2 may face each other, and the electronic device 1000-1 may be inner-folded such that a display surface is not exposed to the outside. For example, when inner-folded, an image displayed by the display surface is not visible.

In an embodiment of the present disclosure, the electronic device 1000-1 may be outer-folded such that the display surface DS is exposed to the outside. For example, when outer-folded, an image displayed by the display surface is visible. In an embodiment of the present disclosure, the electronic device 1000-1 may be inner-folded or outer-folded from an unfolded state, but is not limited thereto.

In FIG. 2, an example in which one folding axis FX is defined in the electronic device 1000-1 is shown as an example, but the present disclosure is not limited thereto. For example, a plurality of folding axes may be defined in the electronic device 1000-1, and the electronic device 1000-1 may be inner-folded or outer-folded on each of the plurality of folding axes from the unfolded state. For example, the electronic device 1000-1 may be folded to occupy an area smaller than that shown in FIG. 2 when a plurality of folding axes is present. Alternatively, the electronic device 1000-1 may have an active area greater than that shown in FIG. 2 when a plurality of folding axes is present.

Although the bar-type electronic device 1000 and the foldable-type electronic device 1000-1 have been described as examples in FIGS. 1 and 2, the present disclosure is not limited thereto. For example, descriptions described below may be applied to various electronic devices such as a curved electronic device, a rollable electronic device, or a slideable electronic device.

Figure 3:
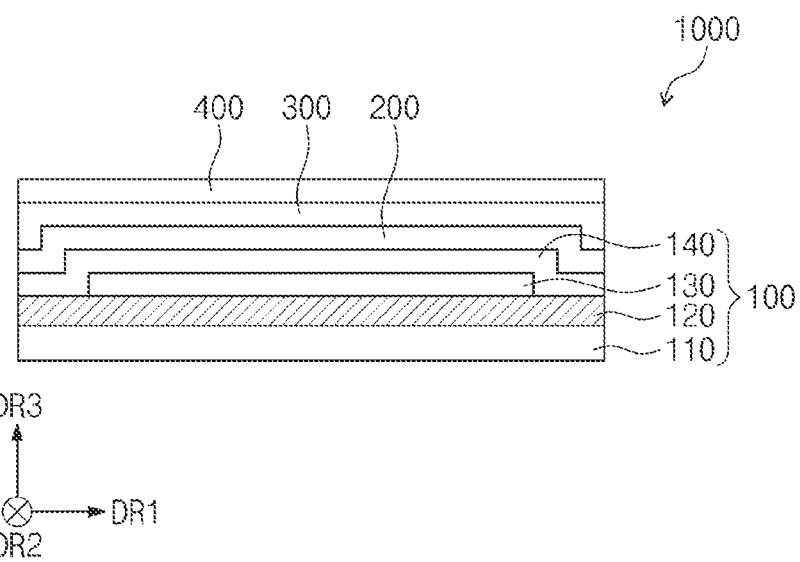
FIG. 3 is a cross-sectional view of an electronic device according to an embodiment of the present disclosure.

FIG. 3 is a cross-sectional view of the electronic device 1000 according to an embodiment of the present disclosure.

Referring to FIG. 3, the electronic device 1000 may include a display layer 100, a sensor layer 200, an anti-reflection layer 300, and a window 400.

The display layer 100 may include a base layer 110, a circuit layer 120, a light emitting element layer 130, and an encapsulation layer 140. For example, the circuit layer 120 may be formed on the base layer 110, the light emitting layer 130 may be formed on the circuit layer 120, and the encapsulation layer 140 may be formed on the light emitting layer 130.

The base layer 110 may be a member providing a base surface on which the circuit layer 120 is disposed. For example, the circuit layer 120 may be formed on the base surface. The base layer 110 may be a glass substrate, a metal substrate, a polymer substrate, or the like. However, the embodiment may not be limited thereto, and the base layer 110 may be an inorganic layer, an organic layer, or a composite material layer.

The circuit layer 120 may be disposed on the base layer 110. The circuit layer 120 may include an insulating layer, a semiconductor pattern, a conductive pattern, a signal line, and the like. The insulating layer, a semiconductor layer, and a conductive layer may be formed on the base layer 110 in a scheme such as coating, deposition, and the like and then the insulating layer, the semiconductor layer, and the conductive layer may be selectively patterned via a plurality of photolithography processes. Thereafter, the semiconductor pattern, the conductive pattern, and the signal line included in the circuit layer 120 may be formed. The circuit layer 120 may include circuits for driving the light emitting layer 130.

The light emitting element layer 130 may be disposed on the circuit layer 120. The light emitting element layer 130 may include a light emitting element. For example, the light emitting element layer 130 may contain an organic light emitting material, an inorganic light emitting material, an organic-inorganic light emitting material, a quantum dot, a quantum rod, a micro LED, or a nano LED. For example, the light emitting layer 130 may include one or more pixels for displaying an image.

The encapsulation layer 140 may be disposed on the light emitting element layer 130. The encapsulation layer 140 may protect the light emitting element layer 130 from foreign substances such as moisture, oxygen, and dust particles. The encapsulation layer 140 may surround the light emitting element layer 130.

The sensor layer 200 may be disposed on the display layer 100. For example, the sensor layer 200 may be formed on the encapsulation layer 140. The sensor layer 200 may be formed on the display layer 100 via a continuous process. In an embodiment, the sensor layer 200 is directly disposed on the display layer 100 such that another component is not disposed between the sensor layer 200 and the display layer 100. For example, a separate adhesive member need not be disposed between the sensor layer 200 and the display layer 100. Alternatively, the sensor layer 200 may be bonded to the display layer 100 via the adhesive member. The adhesive member may include an adhesive material.

The anti-reflection layer 300 may be disposed on the sensor layer 200. The anti-reflection layer 300 may reduce a reflectance of external light incident from the outside of the electronic device 1000. The anti-reflection layer 300 may be directly disposed on the sensor layer 200. However, the present disclosure is not limited thereto. For example, the adhesive member may be disposed between the anti-reflection layer 300 and the sensor layer 200.

The window 400 may be disposed on the anti-reflection layer 300. The adhesive member may be disposed between the anti-reflection layer 300 and the window 400, but the present disclosure is not limited thereto. The window 400 may contain an optically transparent insulating material. For example, the window 400 may contain glass or plastic. The window 400 may have a multi-layer structure or a single-layer structure. For example, the window 400 may include a plurality of plastic films bonded together with the adhesive, or may include a glass substrate and the plastic film bonded together with the adhesive.

Figure 4:
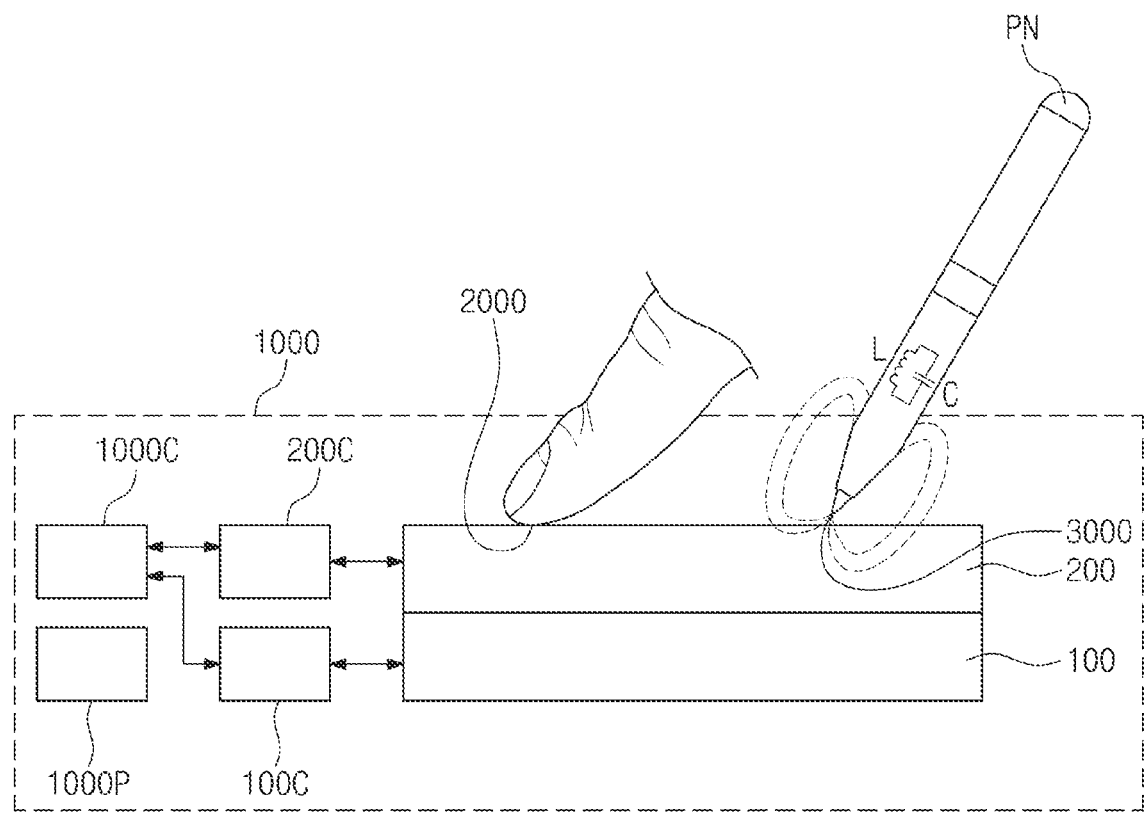
FIG. 4 is a diagram for illustrating an operation of an electronic device according to an embodiment of the present disclosure.

FIG. 4 is a diagram for illustrating an operation of the electronic device 1000 according to an embodiment of the present disclosure.

Referring to FIG. 4, the electronic device 1000 may include the display layer 100, the sensor layer 200, a display driver 100C (e.g., a first driver circuit), a sensor driver 200C (e.g., a second driver circuit), a main driver 1000C (e.g., a third driver circuit), and a power circuit 1000P.

The display layer 100 may be a component that generates the image. The display layer 100 may be a light emitting display layer. For example, the display layer 100 may be an organic light emitting display layer, an inorganic light emitting display layer, an organic-inorganic light emitting display layer, a quantum dot display layer, a micro light-emitting-diode (LED) display layer, or a nano LED display layer.

The sensor layer 200 may be disposed on the display layer 100. The sensor layer 200 may sense an external input applied from the outside. The sensor layer 200 may be an integrated sensor continuously formed during a manufacturing process of the display layer 100, or the sensor layer 200 may be an external sensor attached to the display layer 100. The sensor layer 200 may be referred to as a sensor, an input sensing layer, an input sensing panel, an electronic device for sensing input coordinates, or the like.

The sensor layer 200 may sense a first input 2000 or a second input 3000 applied from the outside. Each of the first input 2000 and the second input 3000 may be input means capable of providing a change in a capacitance of the sensor layer 200. For example, the first input 2000 may be passive-type input means such as a user's body. The second input 3000 may be an input by a pen PN. For example, the pen PN may be a passive-type pen or an active-type pen.

In an embodiment of the present disclosure, the pen PN is a device that generates a magnetic field of a predetermined resonant frequency. The pen PN may be configured to transmit an output signal based on an electromagnetic resonance scheme. For example, the pen PN may generate the output signal based on the generated magnetic field. The pen PN may be referred to as an input device, an input pen, a magnetic pen, a stylus pen, or an electromagnetic resonance pen.

In an embodiment, the pen PN includes an inductor-capacitor (LC) resonance circuit. The LC resonance circuit may include an inductor L and a capacitor C. In an embodiment of the present disclosure, the LC resonant circuit is a variable resonant circuit with a changeable resonant frequency. In this case, the inductor L may be a variable inductor and/or the capacitor C may be a variable capacitor, but the present disclosure is not limited thereto.

The inductor L generates a current by a magnetic field formed in the sensor layer 200. The generated current is transmitted to the capacitor C. The capacitor C is charged with a current input from the inductor L and discharges the charged current to the inductor L. Thereafter, the inductor L may emit the magnetic field of the resonant frequency. An induced current may flow through the sensor layer 200 by the magnetic field emitted by the pen PN. The induced current may be transmitted to the sensor driver 200C as a reception signal (or a sensing signal).

The main driver 1000C may control overall operations of the electronic device 1000. For example, the main driver 1000C may control operations of the display driver 100C and the sensor driver 200C. The main driver 1000C may include at least one microprocessor and may further include a graphics controller. The main driver 1000C may be referred to as an application processor, a central processing unit, or a main processor.

The display driver 100C may drive the display layer 100. The display driver 100C may receive image data and a control signal from the main driver 1000C. The control signal may include various signals. For example, the control signal may include an input vertical synchronization signal, an input horizontal synchronization signal, a main clock, a data enable signal, and the like.

The sensor driver 200C may drive the sensor layer 200. The sensor driver 200C may receive the control signal from the main driver 1000C. The control signal may include a clock signal of the sensor driver 200C. In addition, the control signal may further include a mode determination signal for determining a driving mode of the sensor driver 200C and the sensor layer 200.

The sensor driver 200C and the sensor layer 200 may be driven in a first mode, a second mode, or a third mode. For example, the first mode may be a mode for sensing the first input 2000, the second mode may be a charging mode for sensing the second input 3000, and the third mode may be a mode for sensing the second input 3000. The first mode may be referred to as a touch sensing mode, and the second mode and the third mode may be referred to as a pen sensing mode.

Switching between the touch sensing mode and the pen sensing mode may be variously modified. For example, the sensor driver 200C and the sensor layer 200 may sense the first input 2000 and the second input 3000 via time division driving. For example, the sensor layer 200 could sense the first input 2000 for part of a period and the second input 3000 for a remainder of the period. Alternatively, the switching between the touch sensing mode and the pen sensing mode may be performed by a user's selection, or one of the touch sensing mode and the pen sensing mode may be activated or the switching may be performed by activation of a specific application. Alternatively, while the sensor driver 200C and the sensor layer 200 are operating alternately in the touch sensing mode and the pen sensing mode, the touch sensing mode may be maintained when the first input 2000 is sensed, or the pen sensing mode may be maintained when the second input 3000 is sensed.

The sensor driver 200C may calculate coordinate information of the input based on a signal received from the sensor layer 200 and provide a coordinate signal having the coordinate information to the main driver 1000C. The coordinate information may indicate a position on the active area 1000A that was touched. The main driver 1000C executes an operation corresponding to the user input based on the coordinate signal. For example, the main driver 1000C may operate the display driver 100C such that a new application image is displayed on the display layer 100.

The power circuit 1000P may include a power management integrated circuit (PMIC). The power circuit 1000P may generate a plurality of driving voltages for driving the display layer 100, the sensor layer 200, the display driver 100C, and the sensor driver 200C. For example, the plurality of driving voltages may include a gate high voltage, a gate low voltage, an ELVSS voltage, an ELVDD voltage, an initialization voltage, and the like, but is not limited to the above example.

Figure 5:
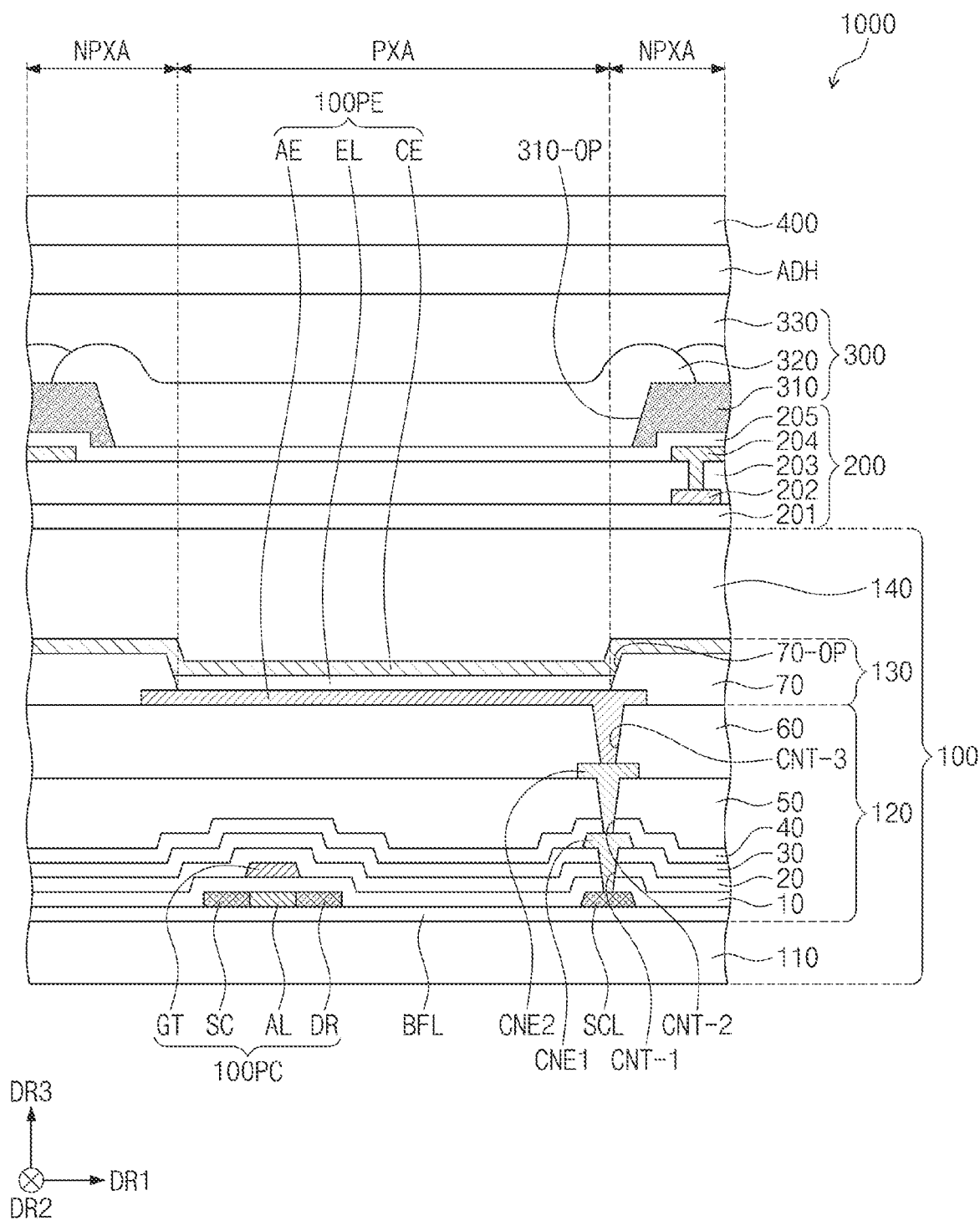
FIG. 5 is a cross-sectional view of an electronic device according to an embodiment of the present disclosure.

FIG. 5 is a cross-sectional view of the electronic device 1000 according to an embodiment of the present disclosure.

Referring to FIG. 5, the electronic device 1000 may include the display layer 100, the sensor layer 200, the anti-reflection layer 300, an adhesive layer ADH, and the window 400. The adhesive layer ADH may be disposed between the anti-reflection layer 300 and the window 400. The adhesive layer ADH may include a conventional adhesive having a light transmissive property.

At least one inorganic layer is formed on a top surface of the base layer 110. The inorganic layer may contain at least one of aluminum oxide, titanium oxide, silicon oxide, silicon nitride, silicon oxynitride, zirconium oxide, and hafnium oxide. The inorganic layer may be composed of multiple layers. The multi-layered inorganic layers may constitute a barrier layer and/or a buffer layer. In the present embodiment, the display layer 100 is illustrated as including a buffer layer BFL.

The buffer layer BFL may increase a bonding strength between the base layer 110 and the semiconductor pattern. The buffer layer BFL may include at least one of silicon oxide, silicon nitride, and silicon oxynitride. For example, the buffer layer BFL may include a structure in which a silicon oxide layer and a silicon nitride layer are alternately stacked.

The semiconductor pattern may be disposed on the buffer layer BFL. The semiconductor pattern may contain polysilicon. However, the present disclosure is not limited thereto. For example, the semiconductor pattern may include an amorphous silicon, a low-temperature polycrystalline silicon, or an oxide semiconductor.

FIG. 5 only shows some semiconductor patterns, and the semiconductor patterns are able to be further disposed in another area. The semiconductor patterns may be arranged according a specific rule across pixels. The semiconductor pattern may have different electrical properties depending on whether it is doped or not. The semiconductor pattern may include a first area with a high conductivity and a second area with a low conductivity. The first area may be doped with an N-type dopant or a P-type dopant. A P-type transistor may include a doped area doped with the P-type dopant, and an N-type transistor may include a doped area doped with the N-type dopant. The second area may be a non-doped area or an area doped with a lower concentration than the first area.

The conductivity of the first area may be greater than that of the second area, and the first area may actually serve as an electrode or a signal line. The second area may substantially correspond to an active area (or a channel) of a transistor. In other words, a portion of the semiconductor pattern may be the active area of the transistor, another portion thereof may be a source or a drain of the transistor, and another portion may be a connection electrode or a connection signal line.

Each of the pixels may have an equivalent circuit including seven transistors, one capacitor, and a light emitting element, and an equivalent circuit diagram of the pixel may be modified in various forms. FIG. 5 illustrates one transistor 100PC and a light emitting element 100PE included in the pixel as an example.

A source area SC, an active area AL, and a drain area DR of the transistor 100PC may be formed from the semiconductor pattern. The source area SC and the drain area DR may extend in opposite directions from the active area AL on a cross-section. FIG. 5 shows a portion of a connection signal line SCL formed from the semiconductor pattern. The connection signal line SCL may be connected to the drain area DR of the transistor 100PC on a plane.

A first insulating layer 10 may be disposed on the buffer layer BFL. The first insulating layer 10 may commonly overlap the plurality of pixels and may cover the semiconductor pattern. The first insulating layer 10 may be an inorganic layer and/or an organic layer, and may have a single-layer or multi-layer structure. The first insulating layer 10 may include at least one of aluminum oxide, titanium oxide, silicon oxide, silicon nitride, silicon oxynitride, zirconium oxide, and hafnium oxide. In the present embodiment, the first insulating layer 10 may be a single-layer silicon oxide layer. In addition to the first insulating layer 10, the insulating layer of the circuit layer 120 to be described later may be an inorganic layer and/or an organic layer, and may have a single-layer or multi-layer structure. The inorganic layer may contain at least one of the above-described materials, but the present disclosure may not be limited thereto.

A gate GT of the transistor 100PC is disposed on the first insulating layer 10. The gate GT may be a portion of a metal pattern. The gate GT overlaps the active area AL. In the process of doping the semiconductor pattern, the gate GT may function as a mask.

A second insulating layer 20 may be disposed on the first insulating layer 10 and may cover the gate GT. The second insulating layer 20 may commonly overlap the pixels. The second insulating layer 20 may be an inorganic layer and/or an organic layer, and may have a single-layer or multi-layer structure. The second insulating layer 20 may contain at least one of silicon oxide, silicon nitride, and silicon oxynitride. In the present embodiment, the second insulating layer 20 may have a multi-layer structure including a silicon oxide layer and a silicon nitride layer.

A third insulating layer 30 may be disposed on the second insulating layer 20. The third insulating layer 30 may have a single-layer or multi-layer structure. For example, the third insulating layer 30 may have a multi-layer structure including a silicon oxide layer and a silicon nitride layer.

A first connection electrode CNE1 may be disposed on the third insulating layer 30. The first connection electrode CNE1 may be connected to the connection signal line SCL via a contact hole CNT-1 extending through the first, second, and third insulating layers 10, 20, and 30.

A fourth insulating layer 40 may be disposed on the third insulating layer 30. The fourth insulating layer 40 may be a single silicon oxide layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 via a contact hole CNT-2 extending through the fourth insulating layer 40 and the fifth insulating layer 50.

A sixth insulating layer 60 may be disposed on the fifth insulating layer 50 and may cover the second connection electrode CNE2. The sixth insulating layer 60 may be an organic layer.

The light emitting element layer 130 may be disposed on the circuit layer 120. The light emitting element layer 130 may include the light emitting element 100PE. For example, the light emitting element layer 130 may contain the organic light emitting material, the inorganic light emitting material, the organic-inorganic light emitting material, the quantum dot, the quantum rod, the micro LED, or the nano LED. Hereinafter, the light emitting element 100PE is described as the organic light emitting element as an example, but the present disclosure is not limited thereto.

The light emitting element 100PE may include a first electrode AE, a light emitting layer EL, and a second electrode CE.

The first electrode AE may be disposed on the sixth insulating layer 60. The first electrode AE may be connected to the second connection electrode CNE2 via a contact hole CNT-3 extending through the sixth insulating layer 60.

A pixel defining film 70 may be disposed on the sixth insulating layer 60 and may cover a portion of the first electrode AE. An opening 70-OP is defined in the pixel defining film 70. The opening 70-OP of the pixel defining film 70 exposes at least a portion of the first electrode AE.

The active area 1000A (see FIG. 1) may include a light emitting area PXA and a non-light emitting area NPXA adjacent to the light emitting area PXA. The non-light emitting area NPXA may surround the light emitting area PXA. In the present embodiment, the light emitting area PXA is defined to correspond to the partial area of the first electrode AE exposed by the opening 70-OP.

The light emitting layer EL may be disposed on the first electrode AE. The light emitting layer EL may be disposed in an area corresponding to the opening 70-OP. That is, the light emitting layers EL may be formed separately in the respective pixels. When the light emitting layers EL are separately formed in the respective pixels, each of the light emitting layers EL may emit light of at least one color of blue, red, and green. However, the present disclosure is not limited thereto, and the light emitting layer EL may be connected to the pixels and commonly included. In this case, the light emitting layer EL may provide blue light or white light.

The second electrode CE may be disposed on the light emitting layer EL. The second electrode CE may have an integral shape and be commonly included in the plurality of pixels. For example, a single layer may be used to form the second electrode CE that is common to the plurality of pixels.

Although not shown, a hole control layer may be disposed between the first electrode AE and the light emitting layer EL. The hole control layer may be commonly disposed in the light emitting area PXA and the non-light emitting area NPXA. The hole control layer may include a hole transport layer and may further include a hole injection layer. An electron control layer may be disposed between the light emitting layer EL and the second electrode CE. The electron control layer may include an electron transport layer and may further include an electron injection layer. The hole control layer and the electron control layer may be commonly formed in the plurality of pixels using an open mask or an inkjet process.

The encapsulation layer 140 may be disposed on the light emitting element layer 130. The encapsulation layer 140 may include sequentially stacked inorganic layer, organic layer, and inorganic layer, but the layers forming the encapsulation layer 140 is not limited thereto. The inorganic layers may protect the light emitting element layer 130 from the moisture and the oxygen, and the organic layer may protect the light emitting element layer 130 from the foreign substances such as dust particles. The inorganic layers may include a silicon nitride layer, a silicon oxynitride layer, a silicon oxide layer, a titanium oxide layer, an aluminum oxide layer, or the like. The organic layer may include an acryl-based organic layer, but is not limited thereto.

The sensor layer 200 may include a base layer 201, a first conductive layer 202, a sensing insulating layer 203, a second conductive layer 204, and a cover insulating layer 205.

The base layer 201 may be an inorganic layer containing at least one of silicon nitride, silicon oxynitride, and silicon oxide. Alternatively, the base layer 201 may be an organic layer containing an epoxy resin, an acrylic resin, or an imide-based resin. The base layer 201 may have a single-layer structure or a multi-layer structure in which the layers are stacked along the third direction DR3.

Each of the first conductive layer 202 and the second conductive layer 204 may have a single-layer structure or a multi-layer structure in which the layers are stacked along the third direction DR3.

The conductive layer of the single-layer structure may include a metal layer or a transparent conductive layer. The metal layer may contain molybdenum, silver, titanium, copper, aluminum, or an alloy thereof. The transparent conductive layer may contain a transparent conductive oxide such as indium tin oxide (ITO), indium zinc oxide (IZO), zinc oxide (ZnO), or indium zinc tin oxide (IZTO). In addition, the transparent conductive layer may contain a conductive polymer such as poly(3,4-ethylenedioxythiophene) (PEDOT), a metal nanowire, graphene, and the like.

The conductive layer of the multi-layer structure may include metal layers. The metal layers may have, for example, a three-layer structure of titanium/aluminum/titanium. The conductive layer of the multi-layer structure may include at least one metal layer and at least one transparent conductive layer.

At least one of the sensing insulating layer 203 and the cover insulating layer 205 may include an inorganic film. The inorganic film may contain at least one of aluminum oxide, titanium oxide, silicon oxide, silicon nitride, silicon oxynitride, zirconium oxide, and hafnium oxide.

At least one of the sensing insulating layer 203 and the cover insulating layer 205 may include an organic film. The organic film may contain at least one of an acrylic resin, a methacrylic resin, polyisoprene, a vinyl resin, an epoxy resin, a urethane resin, a cellulose resin, a siloxane resin, a polyimide resin, a polyamide resin, and a perylene resin.

The anti-reflection layer 300 may be disposed on the sensor layer 200. The anti-reflection layer 300 may include a divided layer 310, a plurality of color filters 320, and a planarization layer 330.

The divided layer 310 may be disposed to overlap a conductive pattern of the second conductive layer 204. The cover insulating layer 205 may be disposed between the divided layer 310 and the second conductive layer 204. In an embodiment of the present disclosure, the cover insulating layer 205 is omitted. When the cover insulating layer 205 is omitted, the second conductor layer 204 may contact the divided layer 310.

The divided layer 310 may prevent reflection of the external light by the second conductive layer 204. In an embodiment, the divided layer 310 is formed of a material that absorbs light. For example, the divided layer 310 may be a layer having a black color. In an embodiment, the divided layer 310 may contain a black component or a black coloring agent. The black component may include a black dye and a black pigment. The black component may contain carbon black, metal such as chromium, or an oxide thereof.

A dividing opening 310-OP may be defined in the divided layer 310. The dividing opening 310-OP may overlap the light emitting layer EL. The color filter 320 may be disposed to correspond to the dividing opening 310-OP. The color filter 320 may transmit light provided from the light emitting layer EL overlapping the color filter 320. The light emitting layer EL may overlap the color filter 320.

The planarization layer 330 may cover the divided layer 310 and the color filter 320. The planarization layer 330 may contain an organic material and may provide a planar surface on a top surface of the planarization layer 330. In an embodiment, the planarization layer 330 is omitted.

In an embodiment of the present disclosure, the anti-reflection layer 300 includes a reflection adjustment layer instead of the color filters 320. For example, in the illustration of FIG. 5, the color filters 320 may be omitted, and the reflection adjustment layers may be added at the place where the color filters 320 are omitted. The reflection adjustment layer may selectively absorb light in a partial band of light reflected from inside a display panel and/or the electronic device or light incident from the outside of the display panel and/or the electronic device.

For example, the reflection adjustment layer may absorb light in a first wavelength area in a range from 490 nm to 505 nm and a second wavelength area in a range from 585 nm to 600 nm, so that a light transmittance in the first wavelength area and the second wavelength area may be equal to or lower than 40%. The reflection adjustment layer may absorb light with a wavelength outside of wavelength ranges of the red, green, and blue light emitted from the light emitting layer EL. As such, the reflection adjustment layer may absorb the light with the wavelength that does not belong to the wavelength ranges of the red, green, or blue light emitted from the light emitting layer EL, thereby preventing or minimizing a decrease in a luminance of the display panel and/or the electronic device. In addition, at the same time, a deterioration in a luminous efficiency of the display panel and/or the electronic device may be prevented or minimized and visibility may be increased.

The reflection adjustment layer may be formed as an organic material layer containing a dye, a pigment, or a combination thereof. The reflection adjustment layer may contain a tetraazaporphyrin (TAP)-based compound, a porphyrin-based compound, a metal porphyrin-based compound, an oxazine-based compound, a squarylium-based compound, a triarylmethane-based compound, a polymethine-based compound, an anthraquinone-based compound, a phthalocyanine-based compound, an azo-based compound, a perylene-based compound, a xanthene-based compound, a diimmonium-based compound, a dipyrromethene-based compound, a cyanine-based compound, and a combination thereof.

In an embodiment, the reflection adjustment layer may have a transmittance in a range from about 64% to 72%. The transmittance of the reflection adjustment layer may be adjusted based on a content of the pigment and/or the dye contained in the reflection adjustment layer.

Figure 6A:
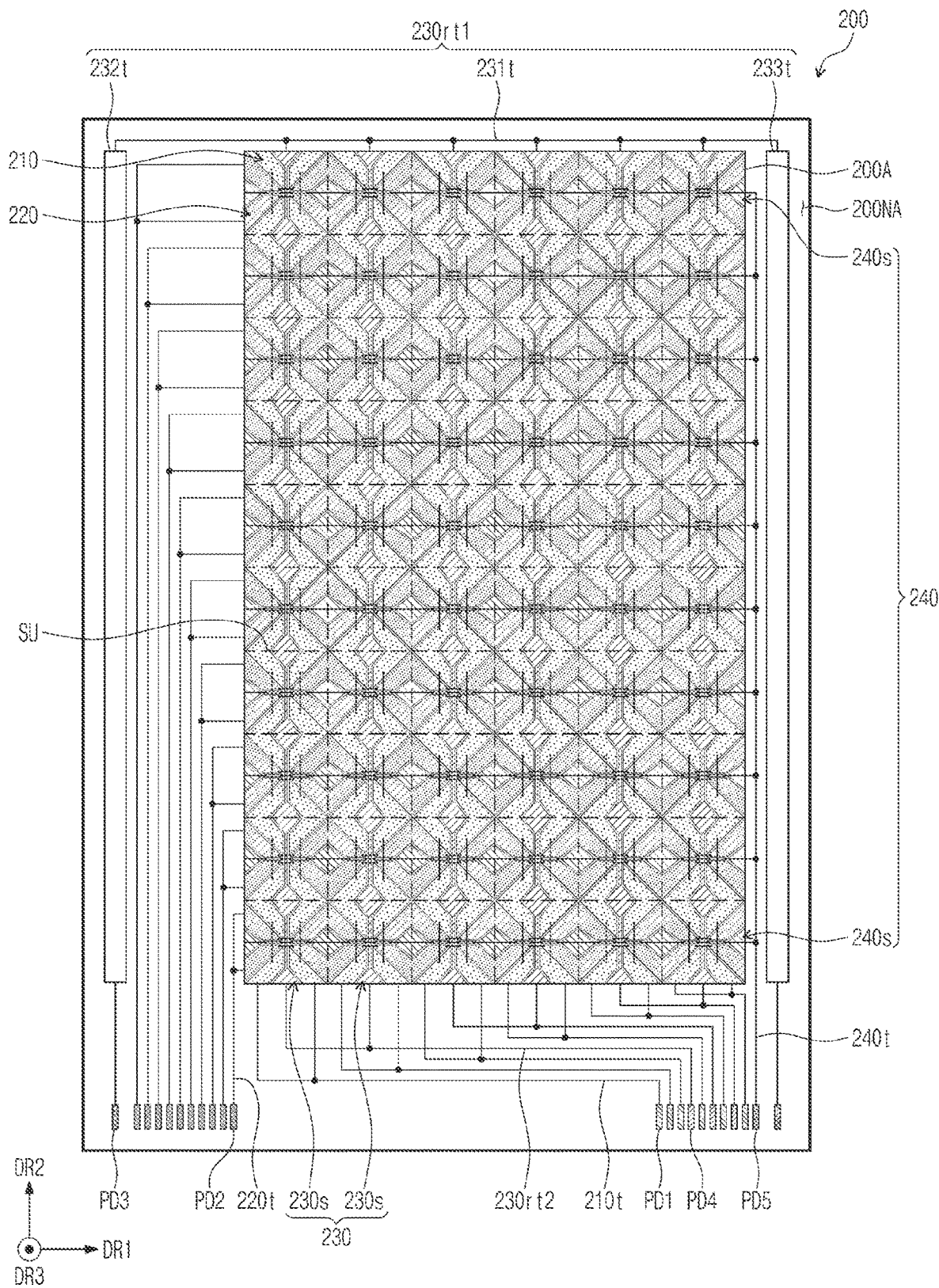
FIG. 6A is a plan view of a sensor layer according to an embodiment of the present disclosure.
Figure 6B:
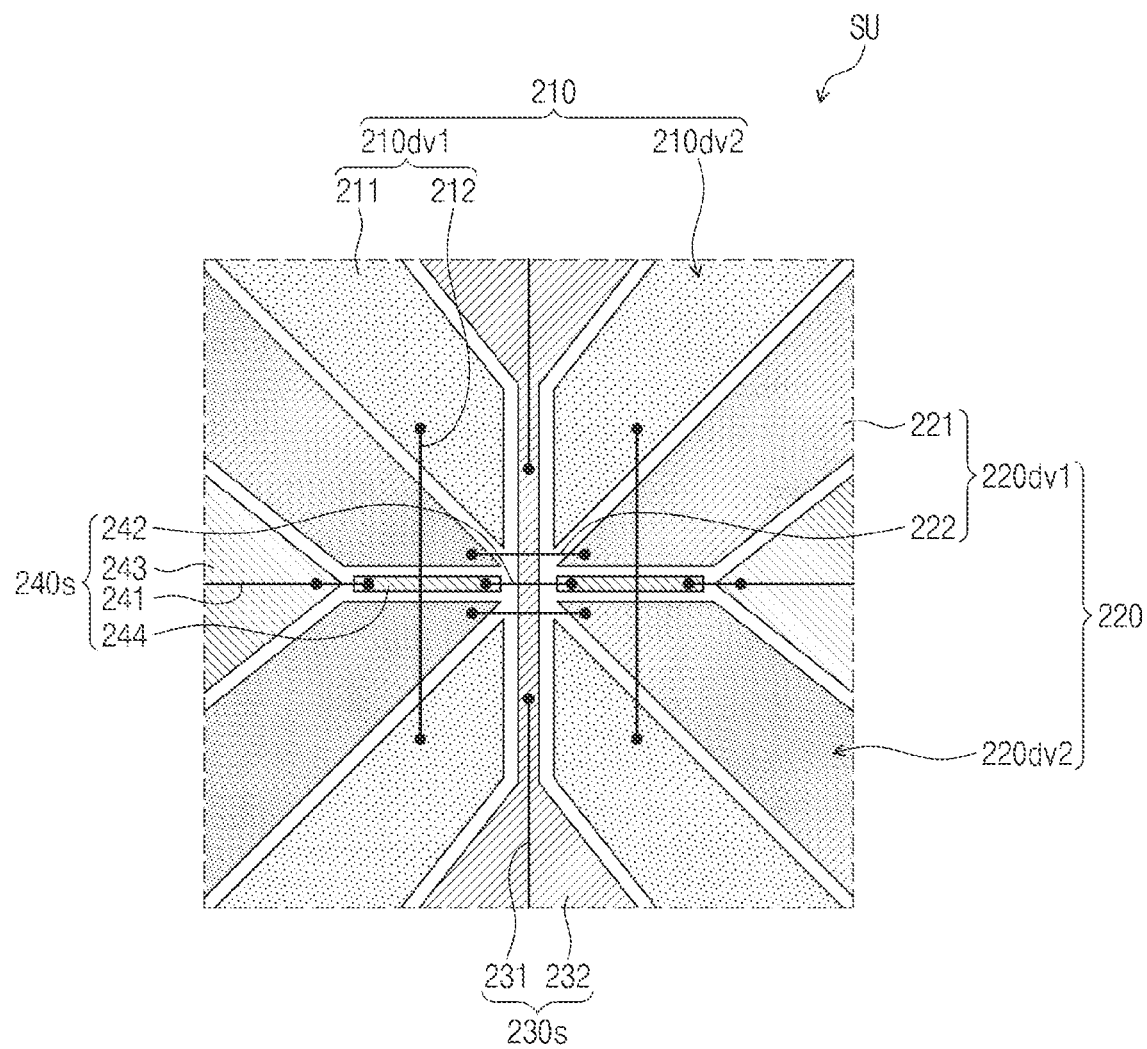
FIG. 6B is an enlarged plan view of one sensing unit according to an embodiment of the present disclosure.
Figure 7A:
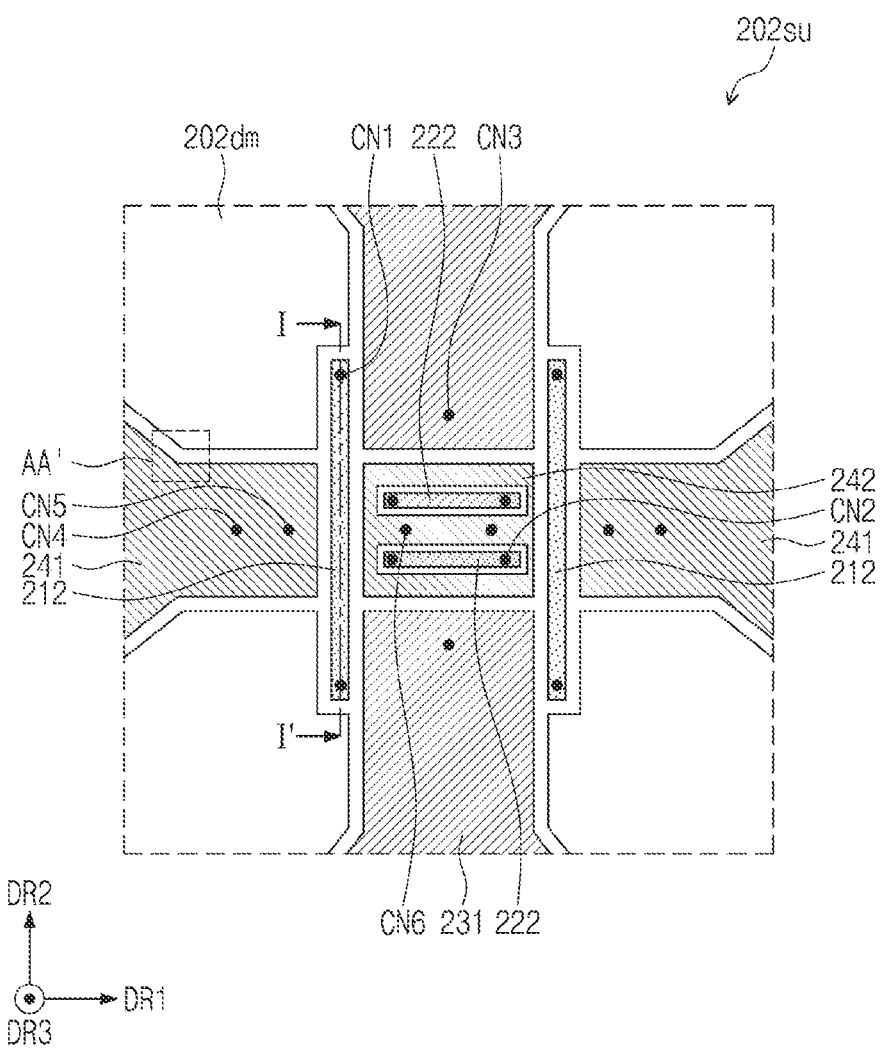
FIG. 7A is a plan view showing a first conductive layer of a sensing unit according to an embodiment of the present disclosure.
Figure 7B:
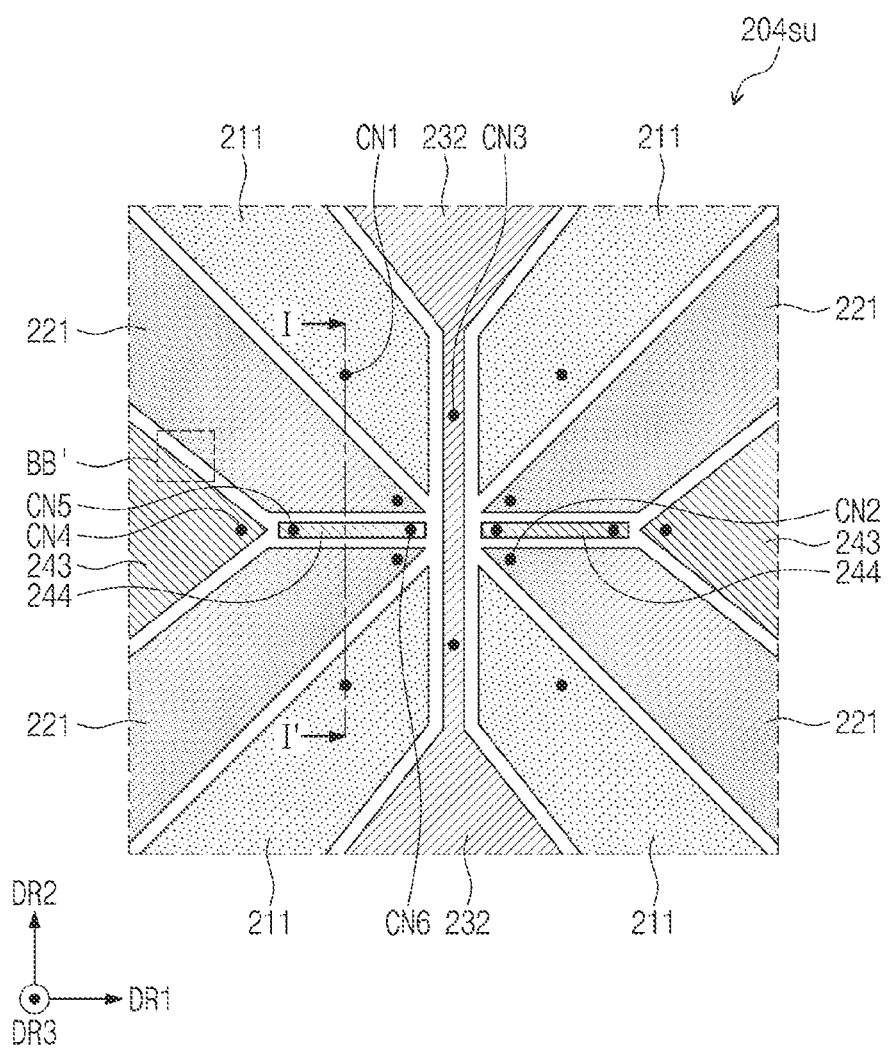
FIG. 7B is a plan view showing a second conductive layer of a sensing unit according to an embodiment of the present disclosure.
Figure 8:
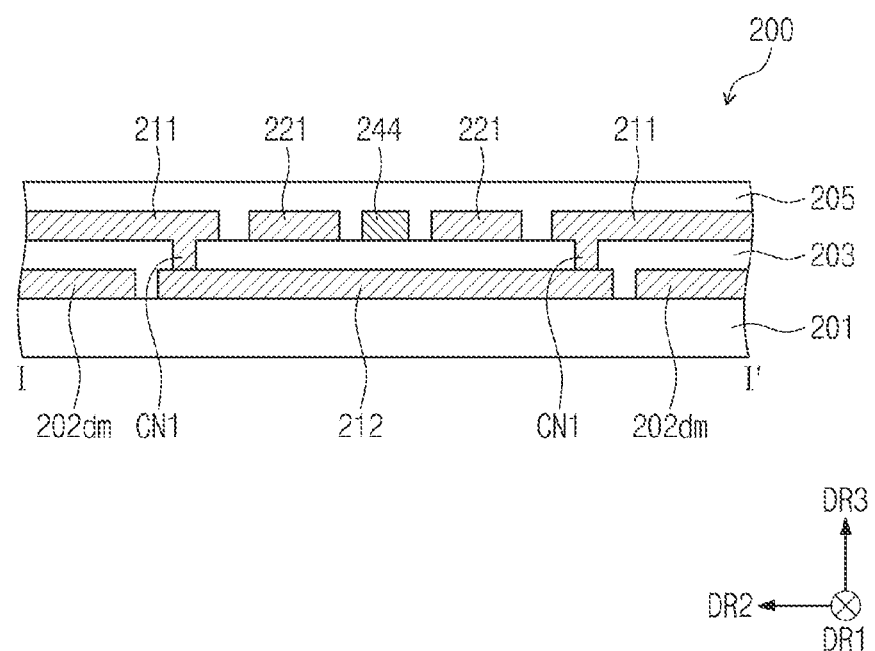
FIG. 8 is a cross-sectional view of a sensor layer according to an embodiment of the present disclosure taken along a line I-I' shown in each of FIGS. 7A and 7B.

FIG. 6A is a plan view of the sensor layer 200 according to an embodiment of the present disclosure. FIG. 6B is an enlarged plan view of one sensing unit SU according to an embodiment of the present disclosure. FIG. 7A is a plan view showing a first conductive layer 202su of the sensing unit SU according to an embodiment of the present disclosure. FIG. 7B is a plan view showing a second conductive layer 204su of the sensing unit SU according to an embodiment of the present disclosure. FIG. 8 is a cross-sectional view of the sensor layer 200 according to an embodiment of the present disclosure taken along a line I-I' shown in each of FIGS. 7A and 7B.

Referring to FIGS. 6A and 6B, a sensing area 200A and a peripheral area 200NA adjacent to the sensing area 200A may be defined in the sensor layer 200. The peripheral area 200NA may surround the sensing area 200A.

The sensor layer 200 may include a plurality of first electrodes 210, a plurality of second electrodes 220, a plurality of third electrodes 230, and a fourth electrode 240 disposed in the sensing area 200A. The first electrodes 210 may be referred to as first sensing electrodes, the second electrodes 220 may be referred to as second sensing electrodes, the third electrodes 230 may be referred to as first pen sensing electrodes, and the fourth electrode 240 may be referred to as a second pen sensing electrode.

Each of the first electrodes 210 may intersect the second electrodes 220. Each of the first electrodes 210 may extend along the second direction DR2, and the first electrodes 210 may be spaced apart from each other and arranged in the first direction DR1. Each of the second electrodes 220 may extend along the first direction DR1, and the second electrodes 220 may be spaced apart from each other and arranged in the second direction DR2. The sensing unit SU may be an area where one first electrode 210 and one second electrode 220 intersect each other.

In FIG. 6A, the 6 first electrodes 210 and the 10 second electrodes 220 are shown as an example, and the 60 sensing units SU are shown as an example, but the number of first electrodes 210 and the number of second electrodes 220 are not limited thereto.

Each of the first electrodes 210 may include first split electrodes 210dv1 and 210dv2. The first split electrodes 210dv1 and 210dv2 may extend along the second direction DR2 and may be spaced apart from each other in the first direction DR1. The first split electrodes 210dv1 and 210dv2 may have a line-symmetrical shape with respect to a line extending in the second direction DR2. Each of the second electrodes 220 may include second split electrodes 220dv1 and 220dv2. The second electrodes 220 may extend along the first direction DR1 and may be spaced apart from each other in the second direction DR2. The second split electrodes 220dv1 and 220dv2 may have a line-symmetrical shape with respect to a line extending in the first direction DR1.

Referring to FIGS. 6B, 7A, 7B, and 8, each of the first split electrodes 210dv1 and 210dv2 may include a first pattern 211 and a first bridge pattern 212, and each of the second split electrodes 220dv1 and 220dv2 may include a second pattern 221 and a second bridge pattern 222. In an embodiment, the first pattern 211 and the first bridge pattern 212 are disposed on different layers, and the first pattern 211 and the first bridge pattern 212 may be electrically connected to each other via a first contact CN1. In an embodiment, the second pattern 221 and the second bridge pattern 222 are disposed on different layers, and the second pattern 221 and the second bridge pattern 222 may be electrically connected to each other via a second contact CN2. For example, the first bridge pattern 212 and the second bridge pattern 222 may be included in the first conductive layer 202su, and the first pattern 211 and the second pattern 221 may be included in the second conductive layer 204su. The first conductive layer 202su may be included in the first conductive layer 202 in FIG. 5, and the second conductive layer 204su may be included in the second conductive layer 204 in FIG. 5.

Each of the third electrodes 230 may extend along the second direction DR2, and the third electrodes 230 may be spaced apart from each other in the first direction DR1.

In an embodiment of the present disclosure, each of the third electrodes 230 include a plurality of first sub-electrodes 230s connected in parallel with each other. The number of first sub-electrodes 230s included in each of the third electrodes 230 may be variously changed. For example, as the number of first sub-electrodes 230s included in each of the third electrodes 230 increases, resistance may be lowered. In addition, an effect of increasing an area size of each of the third electrodes 230 may occur, and accordingly, a coupling capacitance between the first electrodes 210 and the third electrodes 230 may be increased, so that a sensing sensitivity for the second input 3000 (see FIG. 4) may be increased. Conversely, as the number of first sub-electrodes 230s included in each of the third electrodes 230 decreases, the sensing sensitivity may be increased as a loop coil pattern formed using the third electrodes 230 becomes denser, and a dead space may be reduced as the number of fourth pads PD4 connected to the third electrodes 230 in a one-to-one correspondence is reduced.

Although FIG. 6A illustrates that a single third electrode 230 includes the two first sub-electrodes 230s as an example, the present disclosure is not limited thereto. For example, a single third electrode 230 may include more than two first sub-electrodes 230s connected in parallel. The first sub-electrodes 230s may be disposed in the one-to-one correspondence with the first electrodes 210. Accordingly, the one sensing unit SU may include a portion of the one first sub-electrode 230s.

In an embodiment of the present disclosure, because a single third electrode 230 includes the two first sub-electrodes 230s, a single third electrode 230 may correspond to the two first electrodes 210. Accordingly, the number of first electrodes 210 included in the sensor layer 200 may be greater than the number of third electrodes 230. For example, the number of first electrodes 210 may be equal to a product of the number of third electrodes 230 included in the sensor layer 200 and the number of first sub-electrodes 230s included in each of the third electrodes 230. In FIG. 6A, the number of first electrodes 210 may be six, the number of third electrodes 230 may be three, and the number of first sub-electrodes 230s included in each of the third electrodes 230 may be two.

The fourth electrode 240 may include a plurality of sub-electrodes (hereinafter, referred to as second sub-electrodes) 240s connected in parallel with each other. The second sub-electrodes 240s may be arranged along the second direction DR2, and each of the second sub-electrodes 240s may extend along the first direction DR1. In an embodiment, the number of second sub-electrodes 240s included in the fourth electrode 240 is equal to or smaller than the number of second electrodes 220.

In an embodiment of the present disclosure, the sensor layer 200 includes a single fourth electrode 240, and thus, the number of second sub-electrodes 240s may be equal to the number of second electrodes 220. However, the present disclosure is not limited thereto. For example, the sensor layer 200 may include a plurality of fourth electrodes spaced apart from each other in the second direction DR2. In this case, each of the plurality of fourth electrodes may include a plurality of second sub-electrodes 240s.

When the fourth electrode 240 includes the plurality of second sub-electrodes 240s, an area size of the fourth electrode 240 may increase. In this case, a coupling capacitance between the fourth electrode 240 and the second electrodes 220 may increase. The sensing sensitivity for the second input 3000 (see FIG. 4) may be increased as the coupling capacitance increases. Accordingly, a sensing sensitivity of the sensor layer 200 may be increased.

Referring to FIGS. 6A, 7A, and 7B, each of the first sub-electrodes 230s may include a third-first pattern 231 and a third-second pattern 232. In an embodiment, the third-first pattern 231 and the third-second pattern 232 are disposed on different layers, and the third-first pattern 231 and the third-second pattern 232 may be electrically connected to each other via a third contact CN3.

Each of the second sub-electrodes 240s may include a fourth-first pattern 241, a fourth-second pattern 242, a fourth-third pattern 243, and a fourth-fourth pattern 244. In an embodiment, the fourth-first pattern 241 and the fourth-second pattern 242 are disposed on the same layer, and the fourth-third pattern 243 and the fourth-fourth pattern 244 are disposed on the same layer and are disposed on a layer different from that of the fourth-first pattern 241 and the fourth-second pattern 242. For example, the fourth-first pattern 241 and the fourth-third pattern 243 may be electrically connected to each other via a fourth contact CN4, and the fourth-fourth pattern 244 may be electrically connected to the fourth-first pattern 241 via a fifth contact CN5 and may be electrically connected to the fourth-second pattern 242 via a sixth contact CN6.

In an embodiment, the third-first pattern 231, the fourth-first pattern 241, and the fourth-second pattern 242 are included in the first conductive layer 202su, and the third-second pattern 232, the fourth-third pattern 243, and the fourth-fourth pattern 244 are included in the second conductive layer 204su.

In an embodiment of the present disclosure, the first conductive layer 202su further includes dummy patterns 202dm. Each of the dummy patterns 202dm may be electrically floated or electrically grounded. Each of the dummy patterns 202dm may be electrically insulated from the first bridge pattern 212, the second bridge pattern 222, the third-first pattern 231, the fourth-first pattern 241, and the fourth-second pattern 242. In an embodiment of the present disclosure, the dummy patterns 202dm are omitted.

The sensor layer 200 may further include a plurality of first trace lines 210t disposed in the peripheral area 200NA, a plurality of first pads PD1 connected to the first trace lines 210t in a one-to-one correspondence, a plurality of second trace lines 220t, and a plurality of second pads PD2 connected to the second trace lines 220t in a one-to-one correspondence.

The first trace lines 210t may be electrically connected to the first electrodes 210 in a one-to-one correspondence, and the second trace lines 220t may be electrically connected to the second electrodes 220 in a one-to-one correspondence. Accordingly, the two first split electrodes 210dv1 and 210dv2 included in the one first electrode 210 may be connected to one of the first trace lines 210t. The two second split electrodes 220dv1 and 220dv2 included in the one second electrode 220 may be connected to one of the second trace lines 220t. Each of the second trace lines 220t may include a plurality of branches to be connected to the two second split electrodes 220dv1 and 220dv2.

The sensor layer 200 may further include a first loop trace line 230rt1 disposed in the peripheral area 200NA, a plurality of third pads PD3 connected to one end and the other end of the first loop trace line 230rt1, a plurality of second loop trace lines 230rt2, the fourth pads PD4 connected to the second loop trace lines 230rt2 in a one-to-one correspondence, a trace line (hereinafter, referred to as a third trace line) 240t, and a fifth pad PD5 connected to the third trace line 240t.

In an embodiment, the first loop trace line 230rt1 is electrically connected to all of the third electrodes 230. The first loop trace line 230rt1 may include a first line portion 231t extending along the first direction DR1 and electrically connected to the third electrodes 230, a second line portion 232t extending along the second direction DR2 from a first end of the first line portion 231t, and a third line portion 233t extending along the second direction DR2 from a second end of the first line portion 231t.

In an embodiment of the present disclosure, each of a resistance of the second line portion 232t and a resistance of the third line portion 233t is equal to or substantially equal to a resistance of one of the third electrodes 230. Accordingly, the second line portion 232t and the third line portion 233t may perform a role of the third electrodes 230, and the same effect as when the third electrodes 230 are also disposed in the peripheral area 200NA may be obtained. For example, one of the second line portion 232t and the third line portion 233t and one of the third electrodes 230 may form a coil. Accordingly, a pen disposed in an area adjacent to the peripheral area 200NA may also be sufficiently charged by the second line portion 232t or the third line portion 233t.

In an embodiment of the present disclosure, to adjust the resistance of the second line portion 232t and the resistance of the third line portion 233t, a width in the first direction DR1 of each of the second line portion 232t and the third line portion 233t may be adjusted. For example, the second line portion 232t and the third line portion 233t may be replaced with line portions of different widths provide a different resistance. However, in an alternate embodiment, the first to third line portions 231t, 232t, and 233t may have substantially the same width as each other.

The second loop trace lines 230rt2 may be connected to the third electrodes 230 in a one-to-one correspondence. That is, the number of second loop trace lines 230rt2 may correspond to the number of third electrodes 230. In FIG. 6A, the three second loop trace lines 230rt2 are shown as an example.

At least one of the second loop trace lines 230rt2 may overlap at least one of the first trace lines 210t. Therefore, an area size of the peripheral area 200NA may be reduced.

In an embodiment of the present disclosure, the sensor layer 200 includes a single third trace line 240t, and the second trace line 220t and the third trace line 240t are spaced apart from each other with the sensing area 200A interposed therebetween. One end of each of the second sub-electrodes 240s may be connected to the third trace line 240t. When the entire second sub-electrodes 240s are connected to the third trace line 240t, the second sub-electrodes 240s may function as one electrode. Accordingly, an effect such as an increase in the area size of the fourth electrode 240 may be achieved. As a result, the coupling capacitance between the fourth electrode 240 and the second electrodes 220 may increase. The sensing sensitivity for the second input 3000 (see FIG.

4) may be increased as the coupling capacitance increased. Accordingly, the sensing sensitivity of the sensor layer 200 may be increased.

Figure 9A:
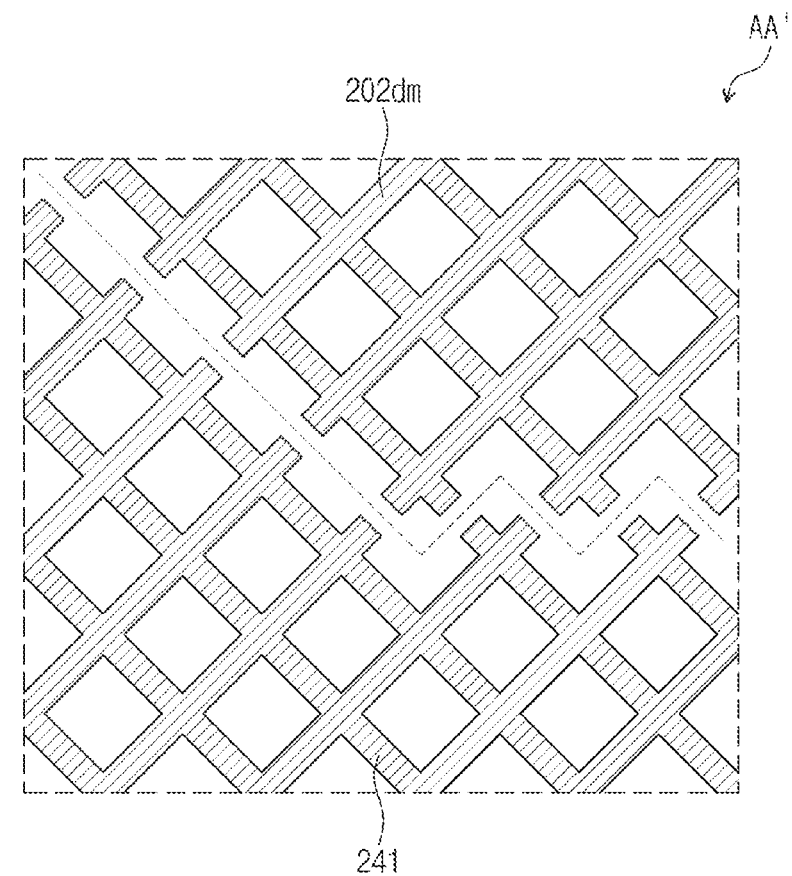
FIG. 9A is an enlarged plan view of an area AA' shown in FIG. 7A.
Figure 9B:
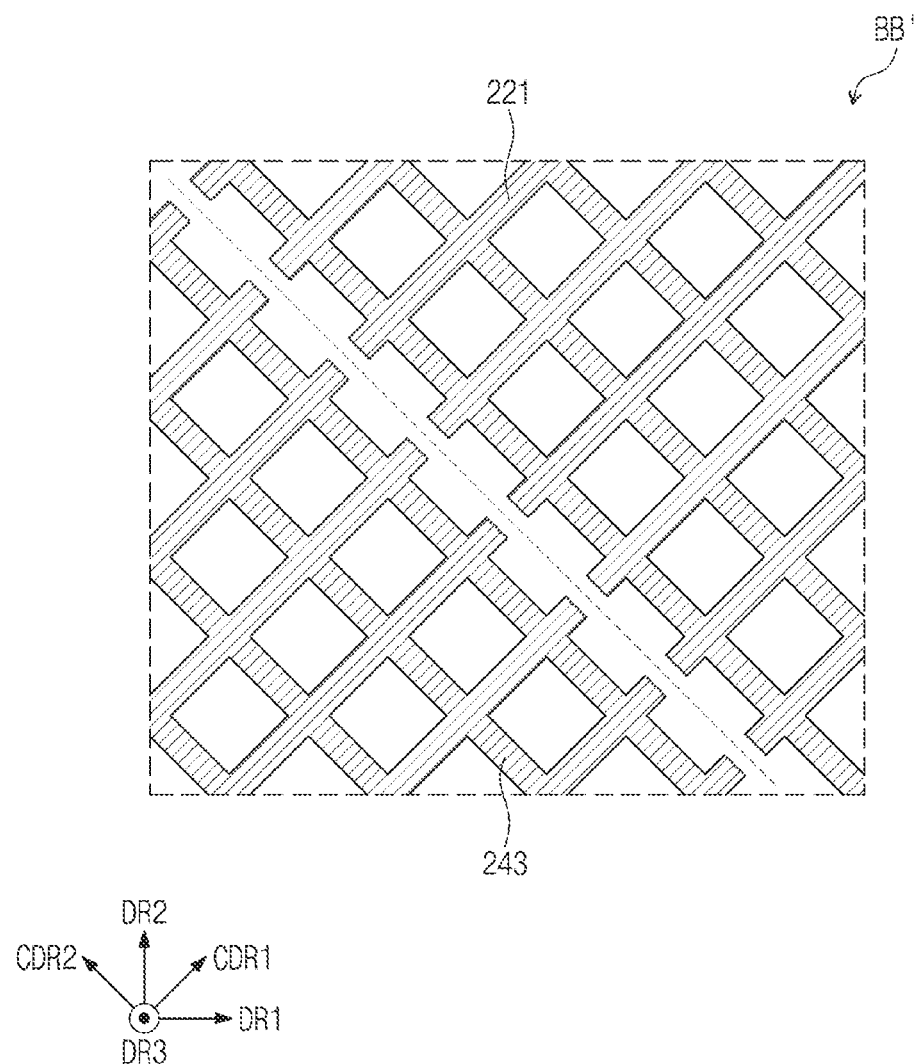
FIG. 9B is an enlarged plan view of an area BB' shown in FIG. 7B.

FIG. 9A is an enlarged plan view of an area AA' shown in FIG. 7A. FIG. 9B is an enlarged plan view of an area BB' as shown in FIG. 7B.

Referring to FIGS. 7A, 7B, 9A, and 9B, each of the first electrodes 210, the second electrodes 220, the third electrodes 230, the fourth electrode 240, and the dummy patterns 202dm may have a mesh structure. Each of the mesh structures may include a plurality of mesh lines. Each of the plurality of mesh lines may have a straight line shape extending in a predetermined direction and the plurality of mesh lines may be connected to each other. An opening in which no mesh structure is disposed may be defined in each of the first electrodes 210, the second electrodes 220, the third electrodes 230, the fourth electrode 240, and the dummy patterns 202dm.

In FIGS. 9A and 9B, it is illustrated that the mesh structure includes mesh lines extending along a first intersecting direction CDR1 intersecting the first direction DR1 and the second direction DR2 and mesh lines extending along a second intersecting direction CDR2 intersecting the first intersecting direction CDR1 as an example. However, the extending direction of the mesh lines constituting the mesh structure is not limited to the illustrations in FIGS. 9A and 9B. For example, the mesh structure may include only mesh lines extending in the first direction DR1 and the second direction DR2, or also include mesh lines extending in the first direction DR1, the second direction DR2, the first intersecting direction CDR1, and the second intersecting direction CDR2. That is, the mesh structure may be changed in various forms.

Figure 10:
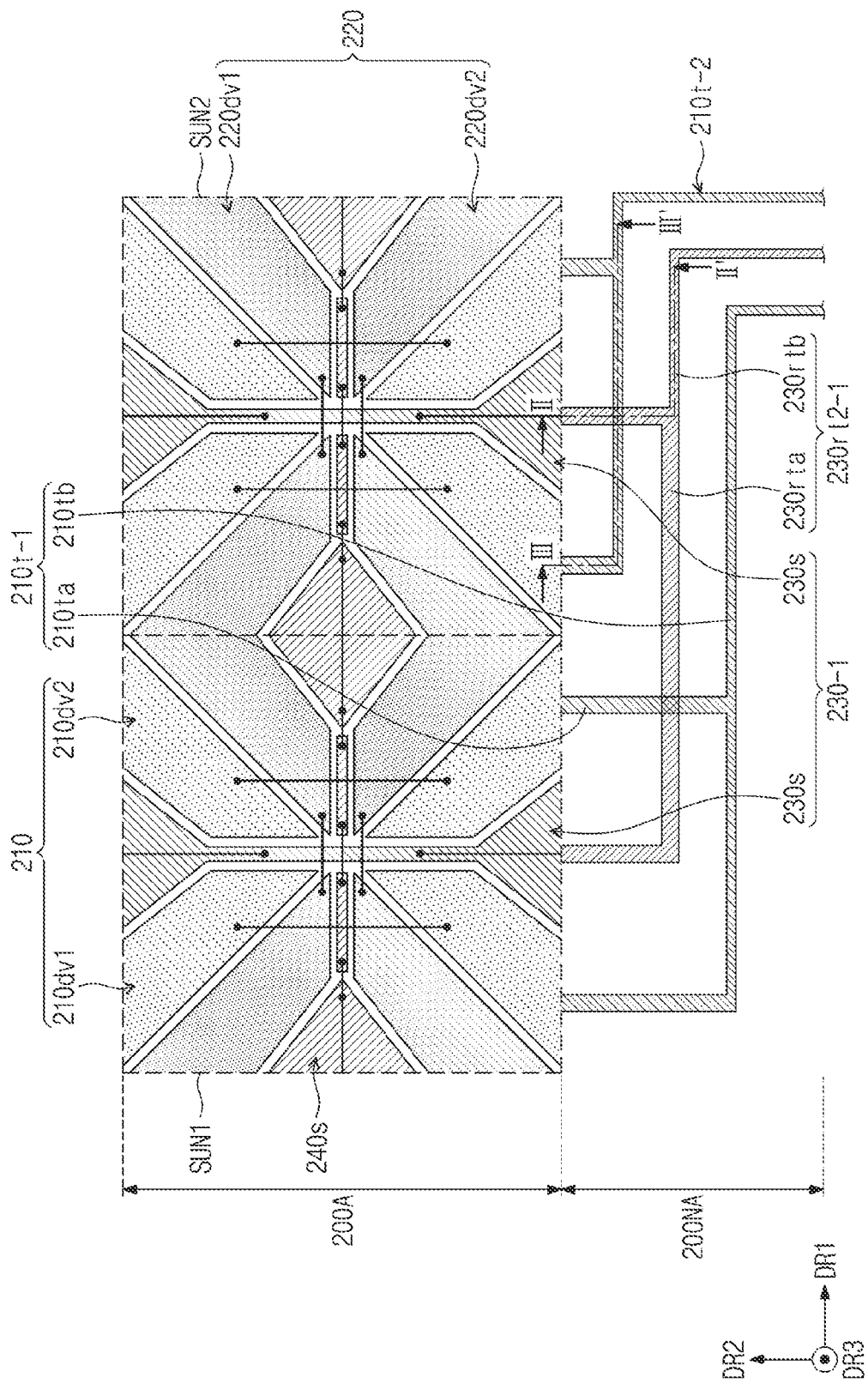
FIG. 10 is an enlarged cross-sectional view of a portion of a sensor layer according to an embodiment of the present disclosure.
Figure 11A:
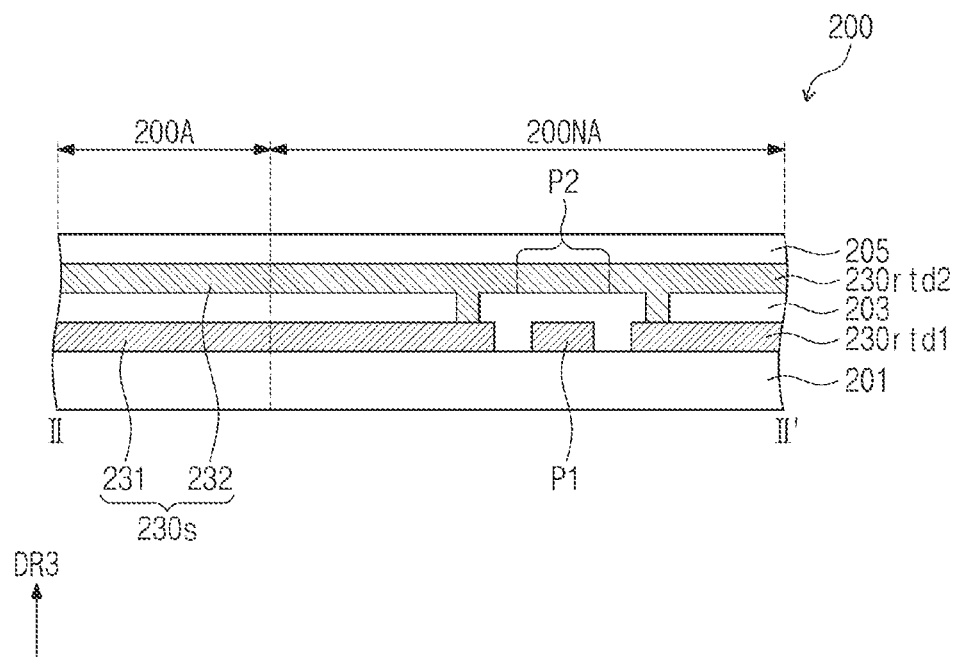
FIG. 11A is a cross-sectional view of a sensor layer according to an embodiment of the present disclosure taken along a line II-II' shown in FIG. 10.

FIG. 10 is an enlarged cross-sectional view of a portion of the sensor layer 200 according to an embodiment of the present disclosure. FIG. 11A is a cross-sectional view of the sensor layer 200 according to an embodiment of the present disclosure taken along a line II-II' shown in FIG. 10.

Referring to FIGS. 6A, 10, and 11A, two sensing units SUN1 and SUN2, two first trace lines 210t-1 and 210t-2, and one second loop trace line 230rt2-1 are shown as an example.

The two sensing units SUN1 and SUN2 may be disposed adjacent to the peripheral area 200NA and may be respectively connected to the two first trace lines 210t-1 and 210t-2. Each of the first trace lines 210t-1 and 210t-2 may include a plurality of first branches 210ta and a first line portion 210tb. In FIG. 10, the plurality of first branches 210ta and the first line portion 210tb are shown as having different thicknesses so as to be distinguished from each other, but widths of the plurality of first branches 210ta and the first line portion 210tb may be equal to each other or different from each other.

The plurality of first branches 210ta may extend from the first line portion 210tb toward the sensing units SUN1 or SUN2. The plurality of first branches 210ta may be connected to the one first electrode 210 corresponding thereto. In an embodiment of the present disclosure, the first electrode 210 includes the two first split electrodes 210dv1 and 210dv2. Accordingly, the number of plurality of first branches 210ta may be equal to or greater than two.

In an embodiment, a single third electrode 230-1 includes the two first sub-electrodes 230s connected in parallel with each other, and a single third electrode 230-1 is connected to the one second loop trace line 230rt2-1.

The second loop trace line 230rt2-1 may include a connection line portion 230rta and an extension line portion 230rtb. The connection line portion 230rta may be connected to the two first sub-electrodes 230s, and the extension line portion 230rtb may extend from the connection line portion 230rta. In FIG. 10, the connection line portion 230rta and the extension line portion 230rtb are shown in as having different thicknesses so as to be distinguished from each other, but widths of the connection line portion 230rta and the extension line portion 230rtb may be equal to each other or different from each other.

A first end of each of the first sub-electrodes 230s may be connected to the second line portion 232t, and a second end spaced apart from the first end of each of the first sub-electrodes 230s in the second direction DR2 may be connected to the connection line portion 230rta. For example, the first end of each of the first sub-electrodes 230s may be connected to the second line portion 232t via an additional connection line.

The second loop trace line 230rt2-1 may overlap the at least one first trace line 210t-1 or 210t-2 depending on a location thereof. For example, the second loop trace line 230rt2-1 may overlap the two first trace lines 210t-1 and 210t-2.

A first portion P1 of the first trace line 210t-2 and a second portion P2 of the connection line portion 230rta of the second loop trace line 230rt2-1 may overlap each other on a plane. When the first portion P1 and the second portion P2 intersect each other in an insulated manner, the first portion P1 and the second portion P2 may be disposed on different layers. For example, the first portion P1 may be disposed between the base layer 201 and the sensing insulating layer 203, and the second portion P2 may be disposed between the sensing insulating layer 203 and the cover insulating layer 205. However, this is only an example, and the location of the first portion P1 and the location of the second portion P2 may be mutually changed.

In an embodiment of the present disclosure, the second loop trace line 230rt2-1 has a multi-layer structure, and may have a single-layer structure at a portion overlapping and intersecting the first trace line 210t-2. For example, the second loop trace line 230rt2-1 may include a first conductive line 230rtd1 and a second conductive line 230rtd2. The first conductive line 230rtd1 may be disposed between the base layer 201 and the sensing insulating layer 203 and may extend from the third-first pattern 231. The second conductive line 230rtd2 may be disposed between the sensing insulating layer 203 and the cover insulating layer 205 and may extend from the third-second pattern 232.

Figure 11B:
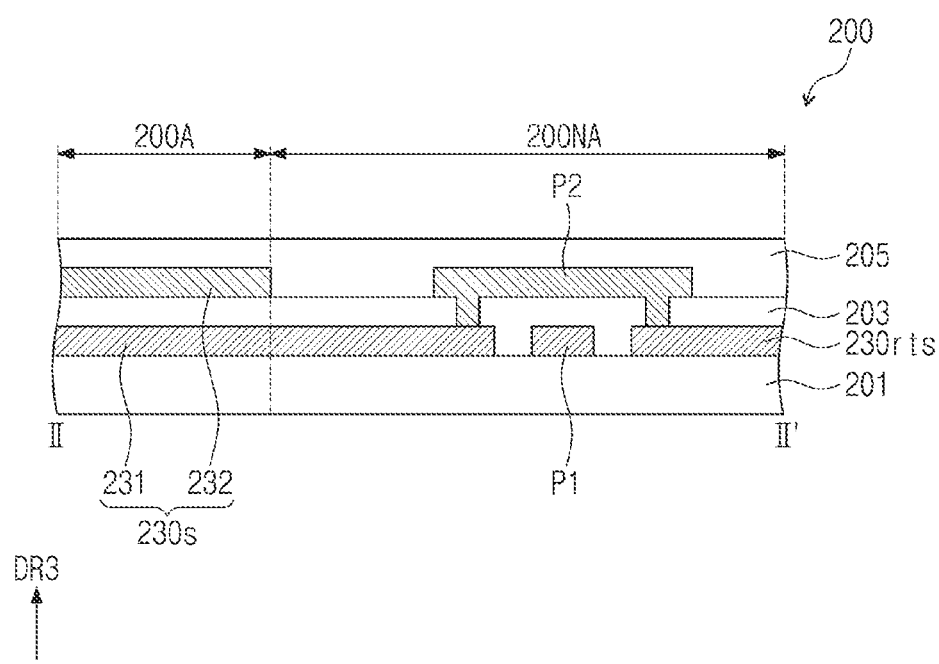
FIG. 11B is a cross-sectional view of a sensor layer according to an embodiment of the present disclosure taken along a line II-II' shown in FIG. 10.

FIG. 11B is a cross-sectional view of the sensor layer 200 according to an embodiment of the present disclosure taken along a line II-II' shown in FIG. 10. In the description of FIG. 11B, only portions that are different from those in FIG. 11A are described, and the same reference numerals are used for the same components and descriptions of the same components are omitted.

Referring to FIGS. 10 and 11B, the second loop trace line 230rt2-1 may have a single layer structure. For example, the second loop trace line 230rt2-1 may include a conductive line 230rts disposed between the base layer 201 and the sensing insulating layer 203. For example, a conductive line 230rts may be formed on the base layer 201, and the sensing insulating layer 203 may be formed on the conductive line 230rts. The conductive line 230rts may extend from the third-first pattern 231.

The first portion P1 of the first trace line 210t-2 and the second portion P2 of the connection line portion 230rta of the second loop trace line 230rt2-1 may overlap each other on the plane. When the first portion P1 and the second portion P2 intersect each other in the insulated manner, the first portion P1 and the second portion P2 may be disposed on the different layers. For example, when the first portion P1 is disposed between the base layer 201 and the sensing insulating layer 203, the second portion P2 of the second loop trace line 230rt2-1 may be disposed between the sensing insulating layer 203 and the cover insulating layer 205. That is, the second portion P2 may also be referred to as a bridge portion included in the second loop trace line 230rt2-1.

Figure 12:
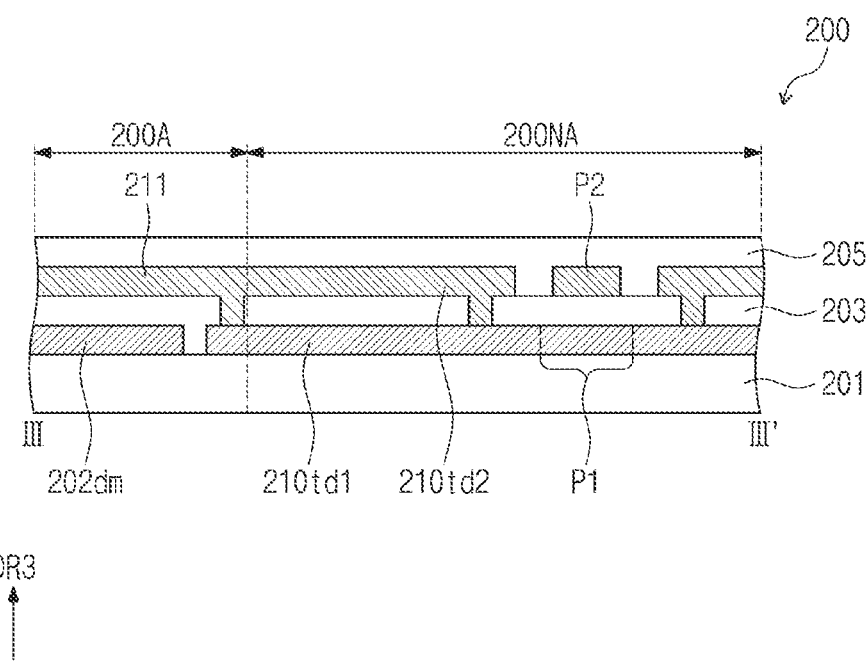
FIG. 12 is a cross-sectional view of a sensor layer according to an embodiment of the present disclosure taken along a line III-III' shown in FIG. 10.

FIG. 12 is a cross-sectional view of the sensor layer 200 according to an embodiment of the present disclosure taken along a line III-III' shown in FIG. 10.

Referring to FIGS. 10 and 12, the first trace line 210t-2 may have a multi-layer structure and may have a single-layer structure at a portion overlapping and intersecting the second loop trace line 230rt2-1. For example, the first trace line 210t-2 may include a first conductive line 210td1 and a second conductive line 210td2. The first conductive line 210td1 may be disposed between the base layer 201 and the sensing insulating layer 203 and may be spaced apart from the dummy pattern 202dm. The second conductive line 210td2 may be disposed between the sensing insulating layer 203 and the cover insulating layer 205 and may extend from the first pattern 211. The first conductive line 210td1 may be electrically connected to the second conductive line 210td2 and the first pattern 211.

The first portion P1 of the first trace line 210t-2 and the second portion P2 of the connection line portion 230rta of the second loop trace line 230rt2-1 may overlap each other on the plane. When the first portion P1 and the second portion P2 intersect each other in an insulated manner, the first portion P1 and the second portion P2 may be disposed on different layers.

In an embodiment of the present disclosure, the first trace line 210t-2 has a single layer structure. Even in this case, because the first portion P1 of the first trace line 210t-2 and the second portion P2 of the connection line portion 230rta of the second loop trace line 230rt2-1 intersect each other in the insulated manner, the first portion P1 and the second portion P2 may be disposed on the different layers.

Figure 13:
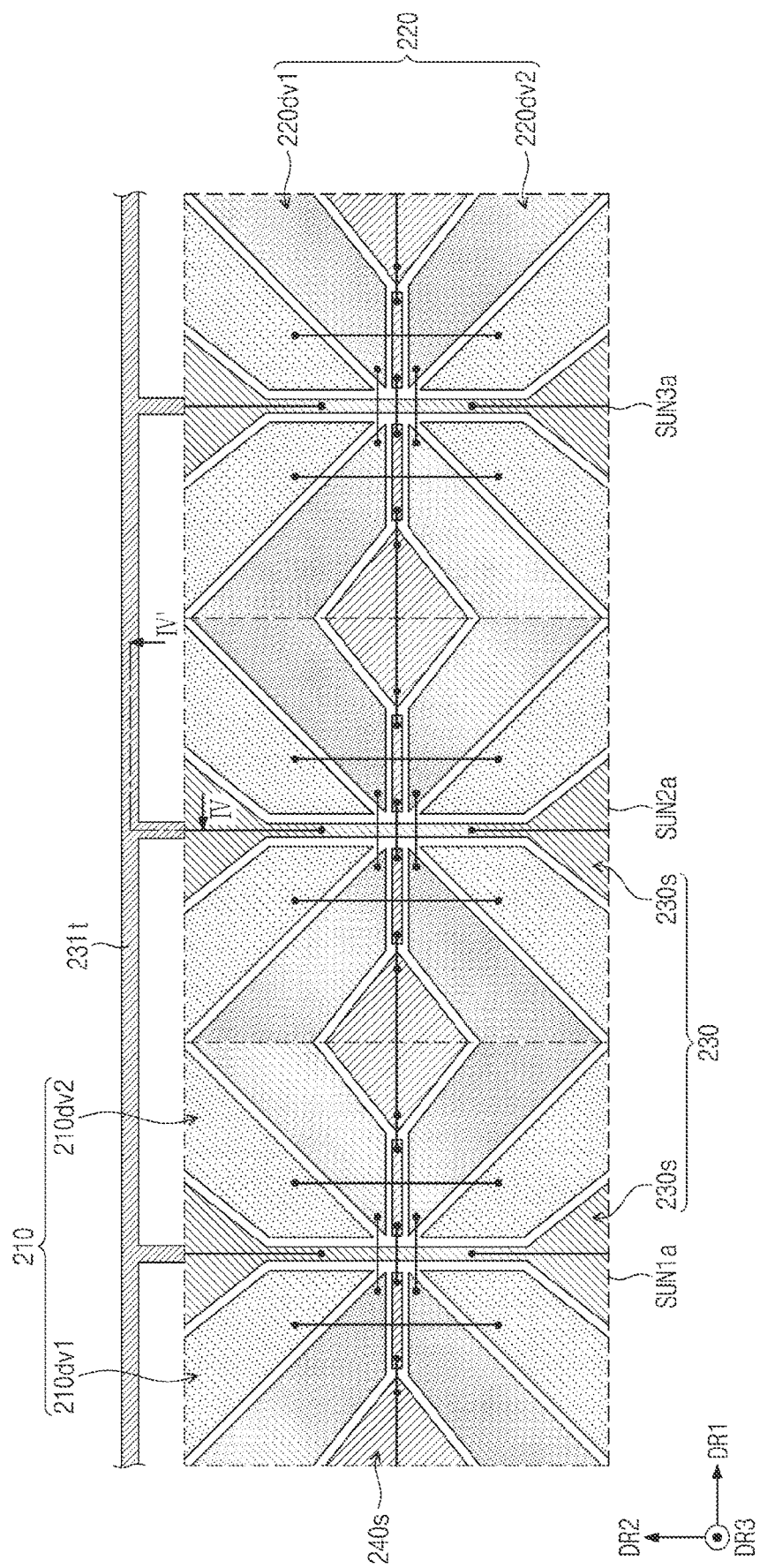
FIG. 13 is an enlarged cross-sectional view of a portion of a sensor layer according to an embodiment of the present disclosure.
Figure 14A:
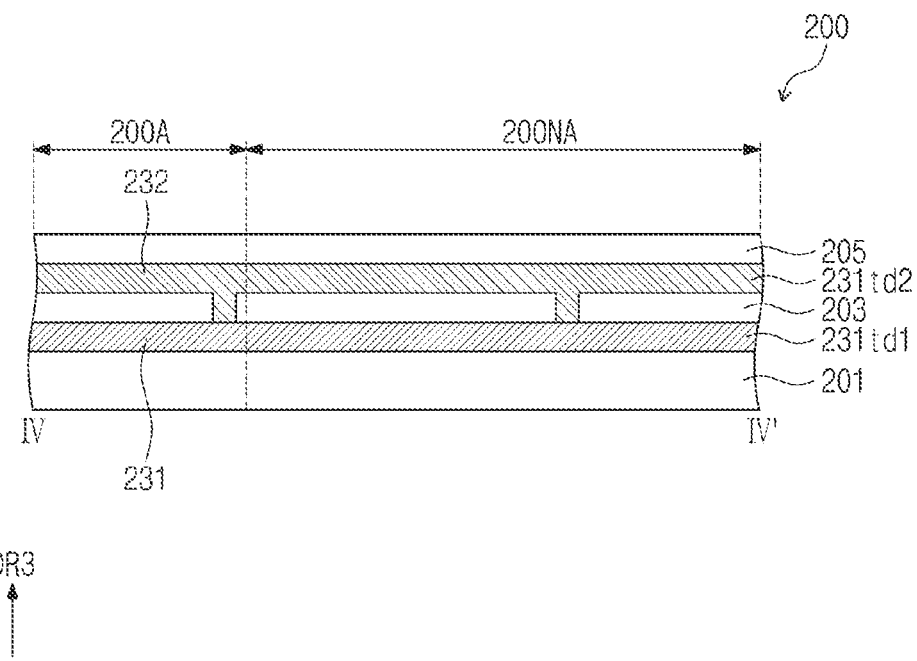
FIG. 14A is a cross-sectional view of a sensor layer according to an embodiment of the present disclosure taken along a line IV-IV' shown in FIG. 13.

FIG. 13 is an enlarged cross-sectional view of a portion of the sensor layer 200 according to an embodiment of the present disclosure. FIG. 14A is a cross-sectional view of the sensor layer 200 according to an embodiment of the present disclosure taken along a line IV-IV' shown in FIG. 13.

Referring to FIGS. 6A, 13, and 14A, three sensing units SUN1a, SUN2a, and SUN3a and the first line portion 231t of the first loop trace line 230rt1 are illustrated as an example. The three sensing units SUN1a, SUN2a, and SUN3a may be disposed adjacent to the peripheral area 200NA and may be connected to the first line portion 231t. The three sensing units SUN1a, SUN2a, and SUN3a may be arranged in a single row.

In an embodiment of the present disclosure, the first loop trace line 230rt1 has a multi-layer structure. For example, the first loop trace line 230rt1 may include a first conductive line 231td1 and a second conductive line 231td2. The first conductive line 231td1 may be disposed between the base layer 201 and the sensing insulating layer 203 and may extend from the third-first pattern 231. The second conductive line 231td2 may be disposed between the sensing insulating layer 203 and the cover insulating layer 205 and may extend from the third-second pattern 232.

Figure 14B:
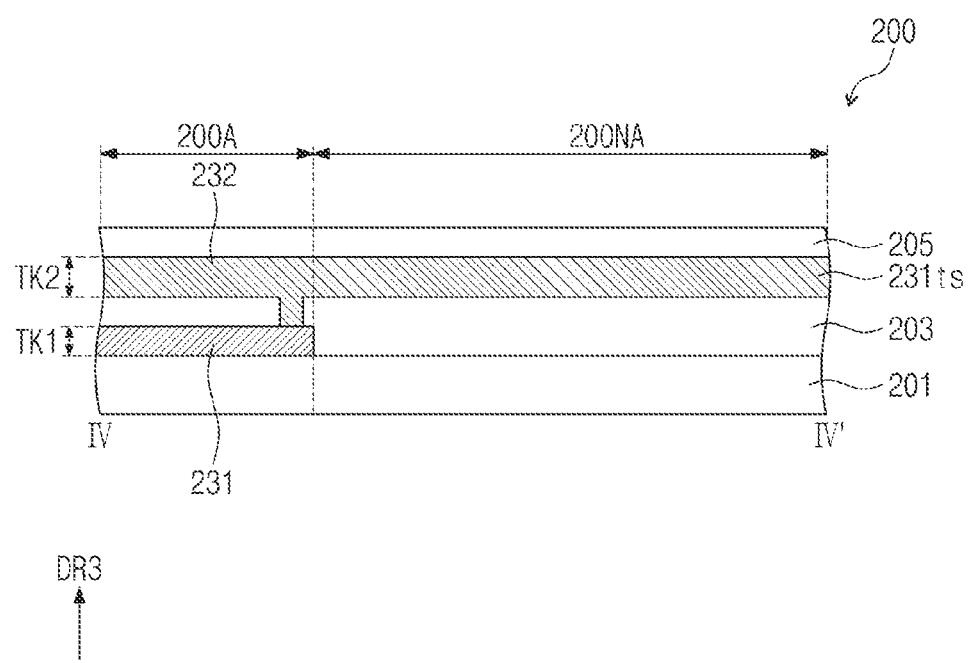
FIG. 14B is a cross-sectional view of a sensor layer according to an embodiment of the present disclosure taken along a line IV-IV' shown in FIG. 13.

FIG. 14B is a cross-sectional view of the sensor layer 200 according to an embodiment of the present disclosure taken along a line IV-IV' shown in FIG. 13. In the description of FIG. 14B, only portions that are different from those in FIG. 14A are described, and the same reference numerals are used for the same components and descriptions of the same components are omitted.

Referring to FIGS. 6A, 13, and 14B, the first loop trace line 230rt1 may have a single-layer structure. For example, the first loop trace line 230rt1 may include a conductive line 231ts disposed between the sensing insulating layer 203 and the cover insulating layer 205.

In an embodiment of the present disclosure, a thickness TK2 of the second conductive layer 204 (see FIG. 5) disposed between the sensing insulating layer 203 and the cover insulating layer 205 is greater than a thickness TK1 of the first conductive layer 202 (see FIG. 5) disposed between the base layer 201 and the sensing insulating layer 203. Accordingly, a resistance of the second conductive layer 204 may be smaller than a resistance of the first conductive layer 202 for the same area size on a plane. Accordingly, the first loop trace line 230rt1 may be included in the second conductive layer 204, and the conductive line 231ts may extend from the third-second pattern 232.

However, when the first loop trace line 230rt1 has the single-layer structure, the first loop trace line 230rt1 may be disposed between the base layer 201 and the sensing insulating layer 203.

Figure 15:
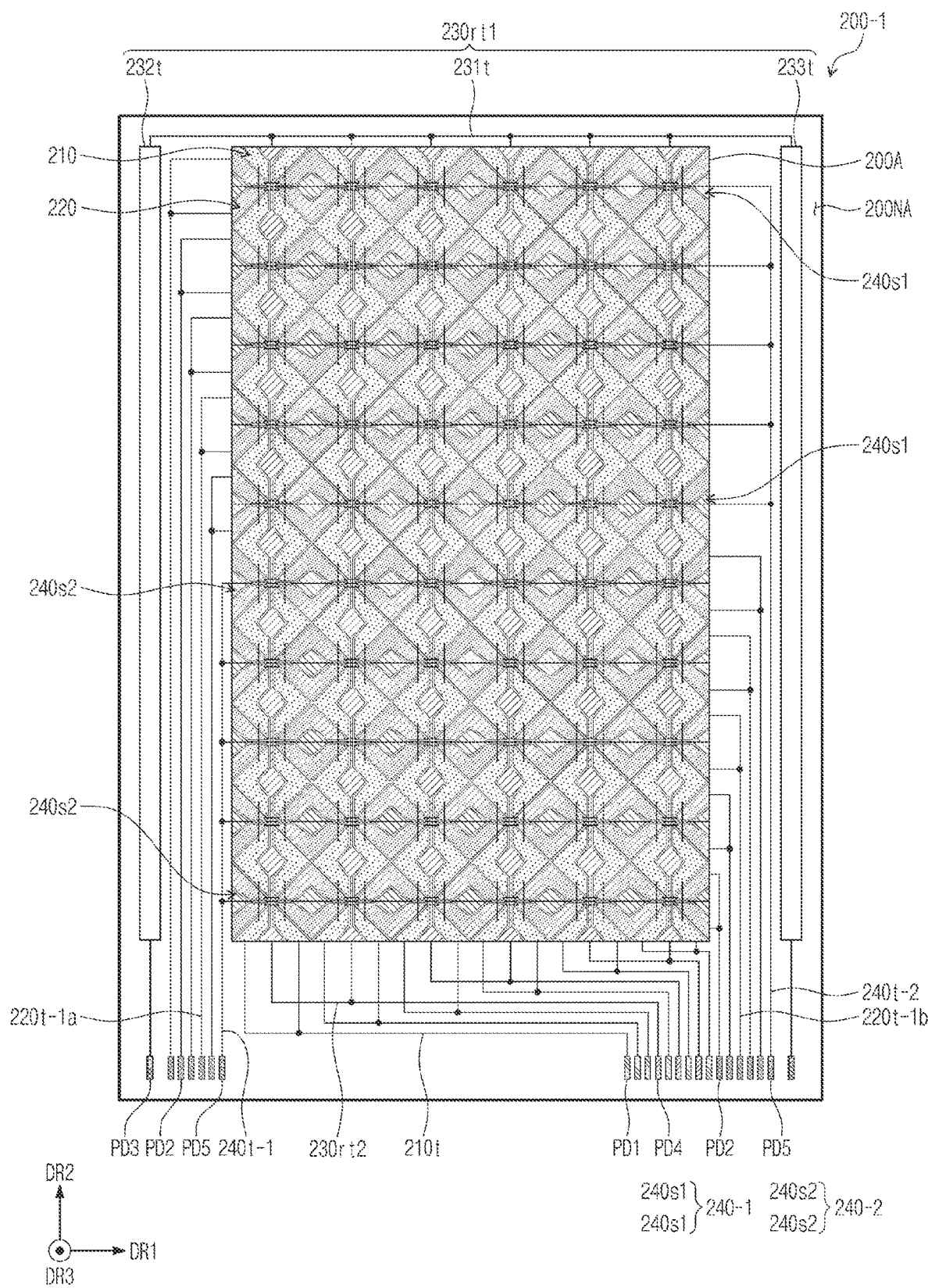
FIG. 15 is a plan view of a sensor layer according to an embodiment of the present disclosure.

FIG. 15 is a plan view of a sensor layer 200-1 according to an embodiment of the present disclosure. In the description of FIG. 15, only portions that are different from those in FIG. 6A are described, and the same reference numerals are used for the same components and descriptions of the same components are omitted. The sensor layer 200 of FIG. 6A may be replaced with the sensor layer 200-1 of FIG. 15.

Referring to FIG. 15, the sensor layer 200-1 may include the plurality of first electrodes 210, the plurality of second electrodes 220, the plurality of third electrodes 230, and a plurality of fourth electrodes 240-1 and 240-2 arranged in the sensing area 200A. The sensor layer 200-1 may further include the plurality of first trace lines 210t, a plurality of second trace lines 220t-1a and 220t-1b, the first loop trace line 230rt1, the plurality of second loop trace lines 230rt2, and a plurality of third trace lines 240t-1 and 240t-2 arranged in the peripheral area 200NA.

In an embodiment of the present disclosure, the fourth electrodes 240-1 and 240-2 are spaced apart from each other in the second direction DR2. Although two fourth electrodes 240-1 and 240-2 are shown in FIG. 15 as an example, the present disclosure is not limited thereto.

In an embodiment, the fourth electrode 240-1 includes a plurality of sub-electrodes 240s1 connected in parallel with each other, and the fourth electrode 240-2 includes a plurality of sub-electrodes 240s2 connected in parallel with each other. In FIG. 15, each of the fourth electrodes 240-1 and 240-2 are shown as including five sub-electrodes 240s1 or 240s2 as an example, but the present disclosure is not limited thereto.

In an embodiment of the present disclosure, some second trace lines 220t-1a of the second trace lines 220t-1a and 220t-1b are spaced apart from the rest second trace lines 220t-1b with the sensing area 200A interposed therebetween. In FIG. 15, it is shown as an example that the 5 second trace lines 220t-1a and the 5 second trace lines 220t-1b are spaced apart from each other with the sensing area 200A interposed therebetween.

The plurality of third trace lines 240t-1 and the plurality of third trace lines 240t-2 may be spaced apart from each other with the sensing area 200A interposed therebetween. For example, a single third trace line 240t-1 may be spaced apart from the 5 second trace lines 220t-1b with the sensing area 200A interposed therebetween, and a single third trace line 240t-2 may be spaced apart from the 5 second trace lines 220t-1a with the sensing area 200A interposed therebetween.

Figure 16A:
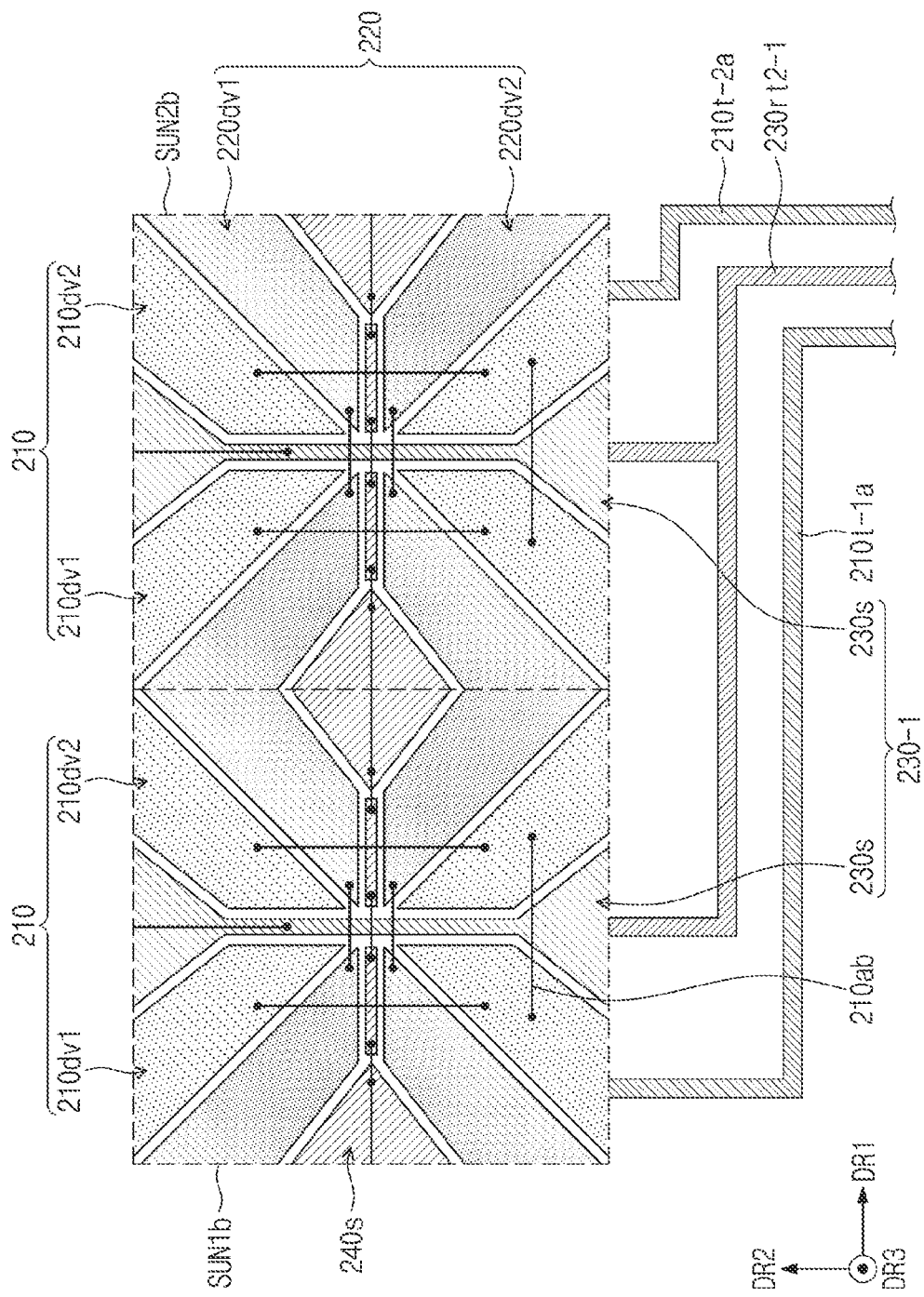
FIG. 16A is an enlarged cross-sectional view of a portion of a sensor layer according to an embodiment of the present disclosure.

FIG. 16A is an enlarged cross-sectional view of a portion of a sensor layer (e.g., 200, 200-1, etc.) according to an embodiment of the present disclosure.

Referring to FIG. 16A, two sensing units SUN1b and SUN2b, two first trace lines 210t-1a and 210t-2a, and the one second loop trace line 230rt2-1 are illustrated as an example. In an embodiment, the two first trace lines 210t-1a and 210t-2a and the one second loop trace line 230rt2-1 do not overlap each other. Accordingly, the two first trace lines 210t-1a and 210t-2a and the one second loop trace line 230rt2-1 may all have a multi-layer structure to reduce resistances thereof, but the present disclosure is not limited thereto.

The first trace lines 210t-1a and 210t-2a may be electrically connected to the first electrodes 210, respectively. In an embodiment of the present disclosure, a single first electrode 210 is connected to the first trace line 210t-1a via one connection point. In this case, each of the sensing units SUN1b and SUN2b may further include an additional bridge pattern 210ab for electrically connecting the two first split electrodes 210dv1 and 210dv2 included in the first electrode 210 to each other.

Figure 16B:
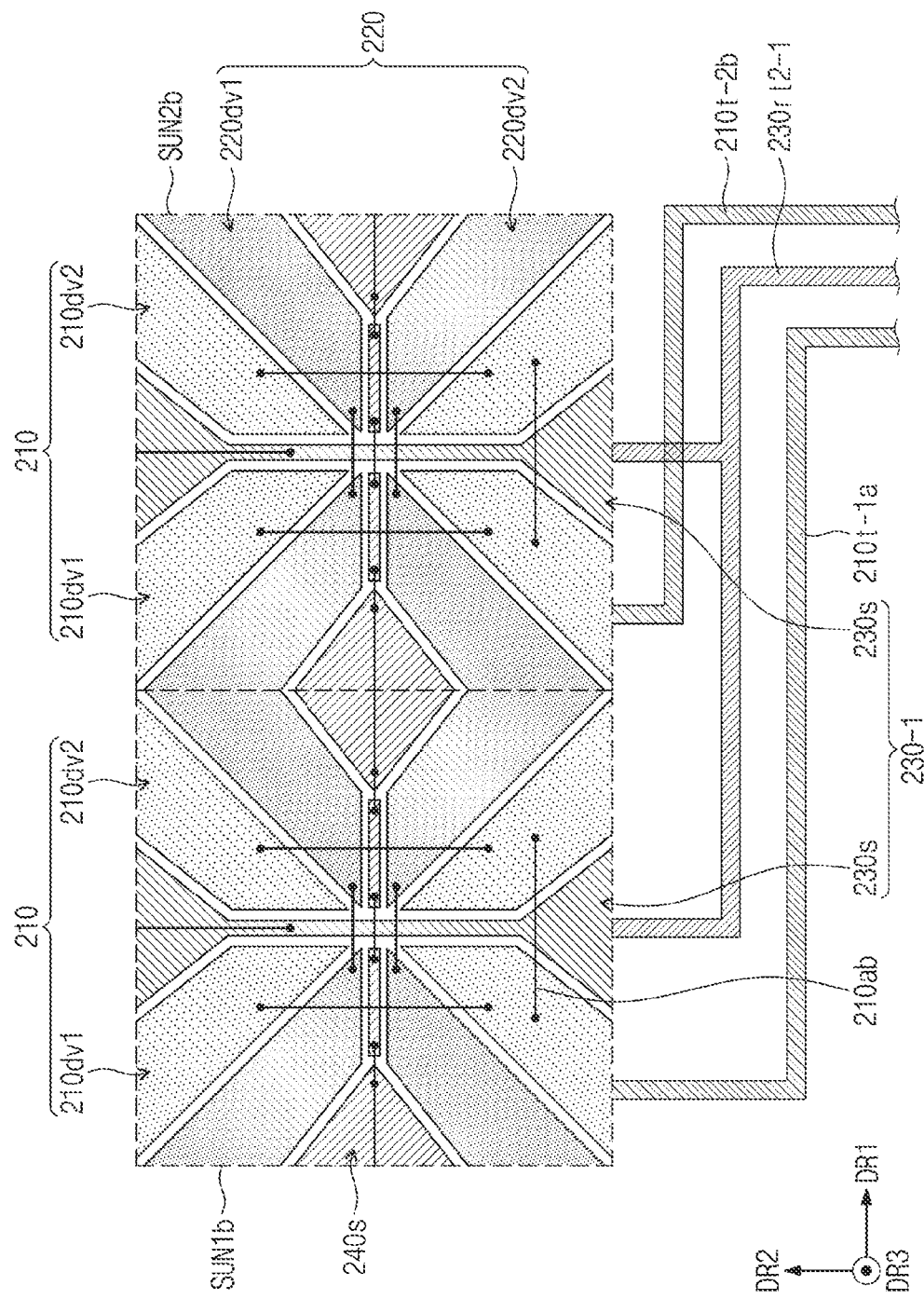
FIG. 16B is an enlarged cross-sectional view of a portion of a sensor layer according to an embodiment of the present disclosure.

FIG. 16B is an enlarged cross-sectional view of a portion of a sensor layer according to an embodiment of the present disclosure.

Referring to FIG. 16B, the two sensing units SUN1b and SUN2b, the two first trace lines 210t-1a and 210t-2b, and the one second loop trace line 230rt2-1 are illustrated as an example. In an embodiment, the second loop trace line 230rt2-1 does not overlap the first trace line 210t-1a and overlaps the first trace line 210t-2b.

The first trace lines 210t-1a and 210t-2b may be electrically connected to the first electrodes 210, respectively. Compared to FIG. 16A, the first trace lines 210t-1a and 210t-2b in FIG. 16B may be connected at substantially the same location of the two sensing units SUN1b and SUN2b.

Figure 17:
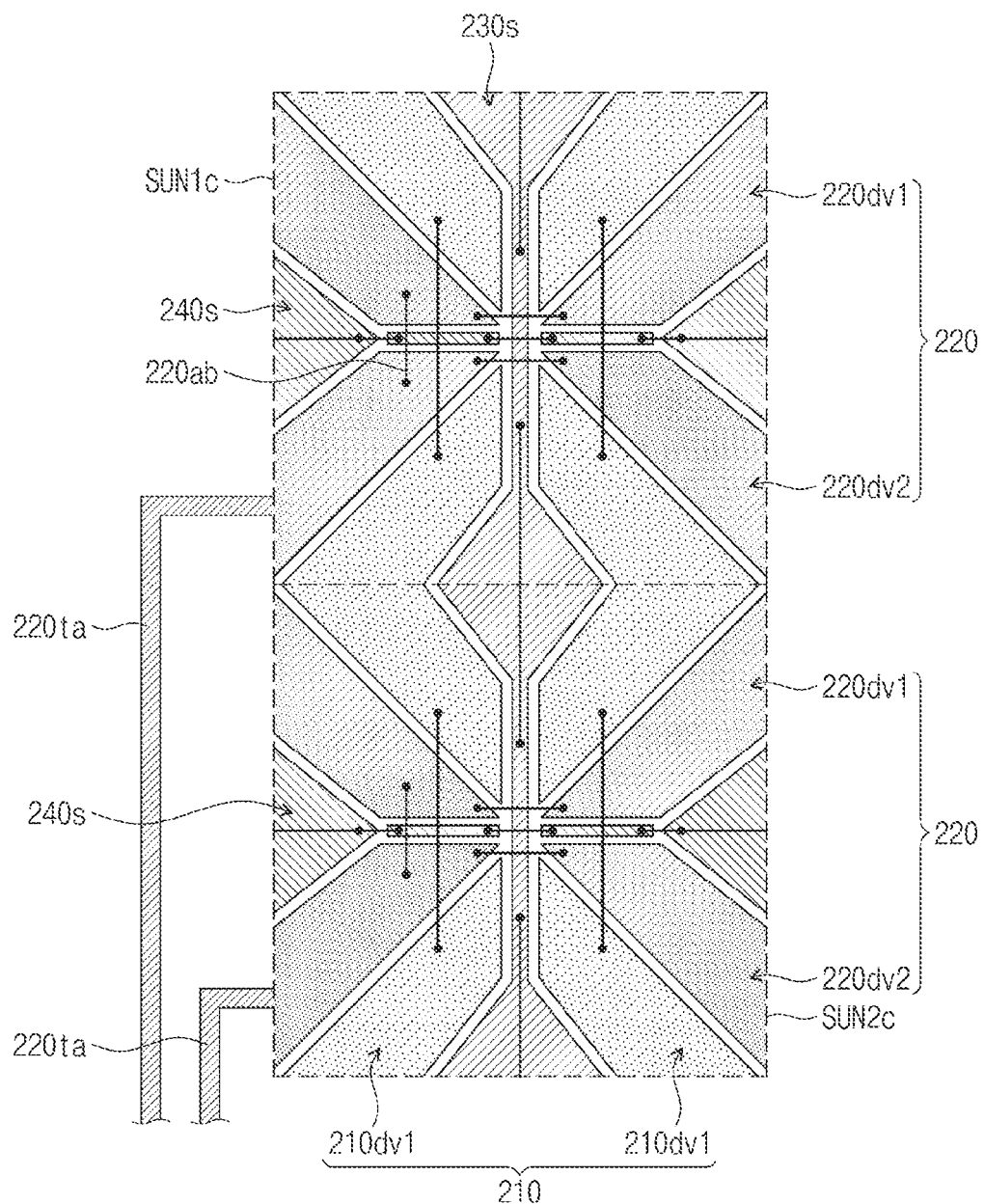
FIG. 17 is an enlarged cross-sectional view of a portion of a sensor layer according to an embodiment of the present disclosure.

FIG. 17 is an enlarged cross-sectional view of a portion of a sensor layer (e.g., 200, 200-1, etc.) according to an embodiment of the present disclosure.

Referring to FIG. 17, two sensing units SUN1c and SUN2c and the two second trace lines 220ta are illustrated as an example.

The second trace lines 220ta may be electrically connected to the second electrodes 220, respectively. In an embodiment of the present disclosure, a single second electrode 220 is connected to the one second trace line 220ta via one connection point. In this case, each of the sensing units SUN1c and SUN2c may further include an additional bridge pattern 220ab for electrically connecting the two second split electrodes 220dv1 and 220dv2 included in the second electrode 220 to each other.

Figure 18:
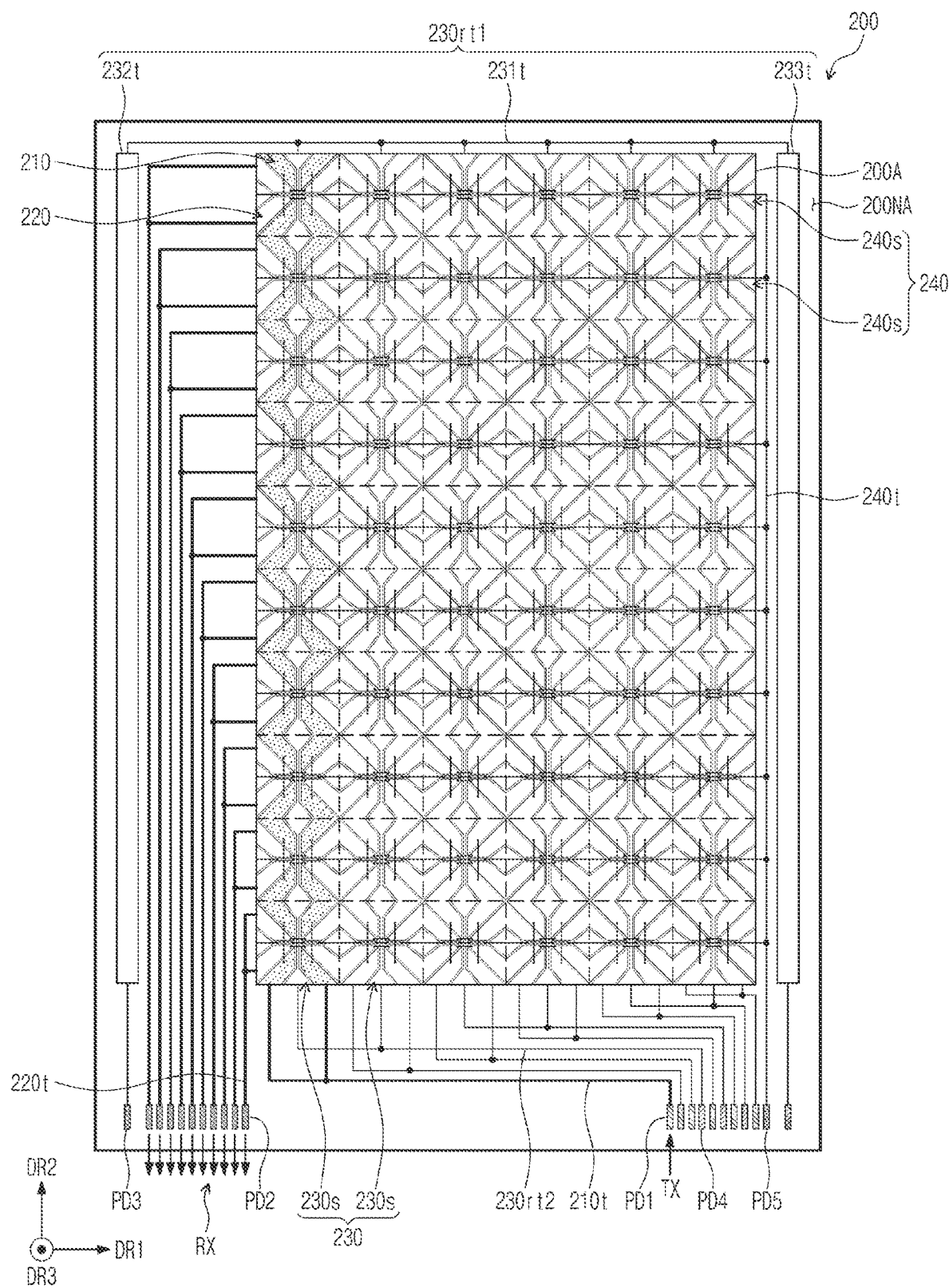
FIG. 18 is a diagram for illustrating a first mode according to an embodiment of the present disclosure.

FIG. 18 is a diagram for illustrating a first mode according to an embodiment of the present disclosure.

Referring to FIGS. 4 and 18, in an embodiment of the first mode, the sensor driver 200C sequentially provides a transmission signal TX to the first electrodes 210, and detects coordinates of the first input 2000 using a reception signal RX detected via the second electrodes 220. For example, the reception signal RX may be generated in response to application of the transmission signal TX. In the first mode, the third electrodes 230 and the fourth electrode 240 may be grounded, applied with a constant voltage, or electrically floated.

In FIG. 18, it is illustrated as an example that the transmission signal TX is provided to a single first electrode 210 and the reception signal RX is output from the second electrodes 220. However, embodiments of the inventive concept are not limited thereto. For example, a single first electrode 210 is depicted as receiving the transmission signal TX in FIG. 18 merely for ease of understanding. The sensor driver 200C may detect the input coordinates of the first input 2000 by sensing a change in a capacitance between the first electrode 210 and each of the second electrodes 220.

Figure 19:
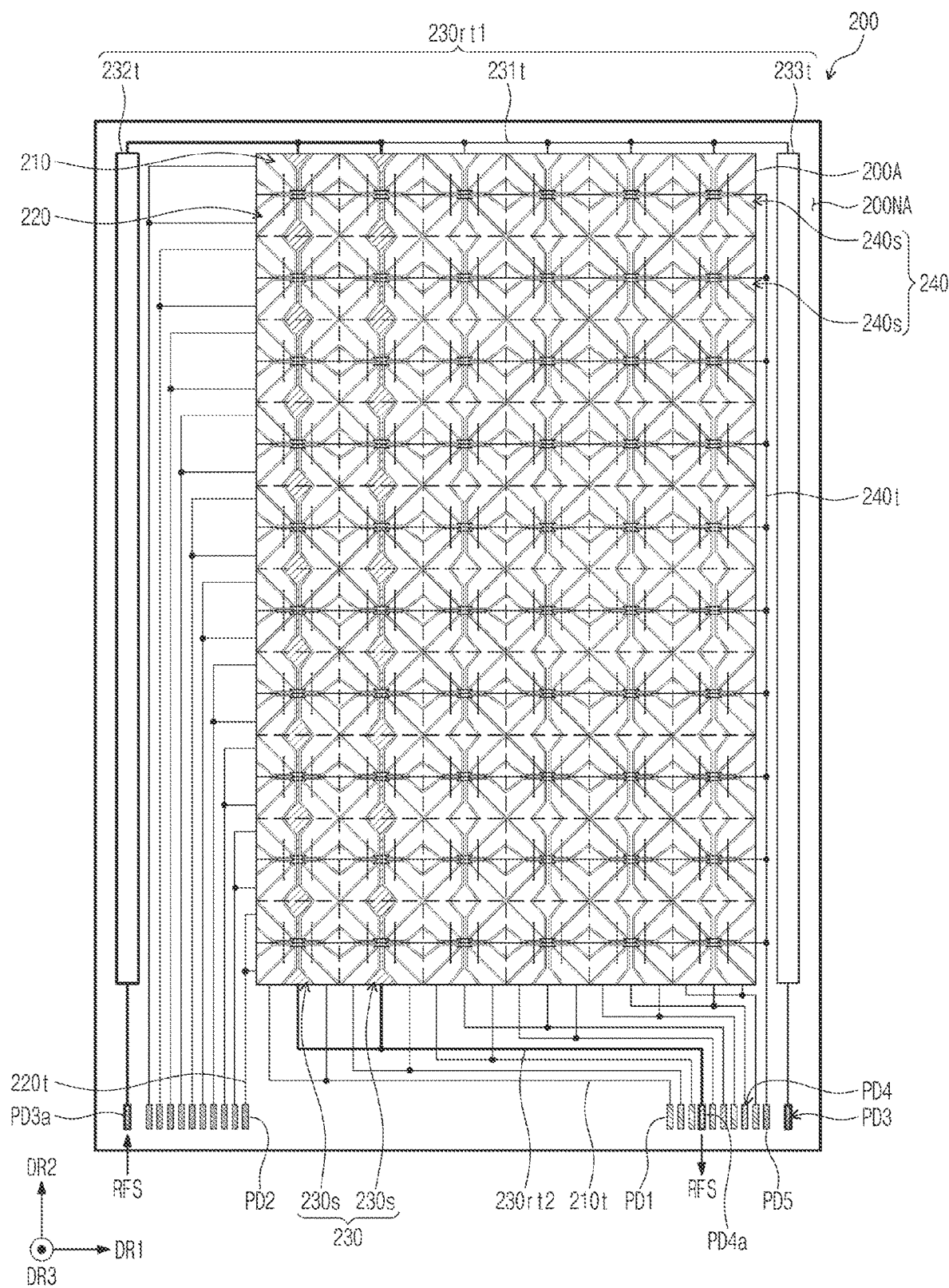
FIG. 19 is a diagram for illustrating a second mode according to an embodiment of the present disclosure.

FIG. 19 is a diagram for illustrating a second mode according to an embodiment of the present disclosure.

Referring to FIGS. 4 and 19, the second mode may be referred to as a charging period. The sensor driver 200C may apply a first signal to one of the third pads PD3 and the fourth pads PD4, and a second signal to another of the third pads PD3 and the fourth pads PD4. The second signal may be an inverse phase signal of the first signal. For example, the first signal may be a signal having a pulse waveform or a signal having a sine waveform. Thus, a current RFS may have a current path flowing through one pad to the other pad. Further, the direction of the current RFS may change periodically because the first signal and the second signal have pulse waveforms or sine waveforms that are inversely related to each other. Further, since the second signal has an inverse phase of the first signal, the noise caused by the first signal and the noise caused by the second signal may cancel each other. Therefore, flicker phenomenon may not occur on the display layer 100 (see FIG. 3).

In an embodiment, in charging period, the sensor drive 200C may be configured to apply the first signal to one of the pads of the third pads PD3 and the fourth pads PD4, while the other pad is grounded. In this case, the current RFS may flow from the one pad to the other pad. Furthermore, even if the other pad is grounded, the direction of the current RFS may change periodically because the first signal has a pulse waveform or a sine waveform.

The one pad to which the first signal is applied and the another pad to which the second signal or ground is applied may be continuously changed. Accordingly, loop coil patterns of various positions and shapes may form magnetic fields.

In FIG. 19, a form in which the current RFS is supplied to one third pad PD3a and the current RFS is received via one fourth pad PD4a is illustrated as an example. In this case, a current path in a form of a coil may be defined by a portion of the first loop trace line 230rt1 connected to the third pad PD3a, a portion of the second loop trace line 230rt2 connected to the fourth pad PD4a, and the third electrode 230 connected to the second loop trace line 230rt2. In an embodiment of the second mode, a resonant circuit of the pen PN is charged by the current path. According to the present disclosure, a current path of the loop coil pattern may be implemented by components included in the sensor layer 200. The electronic device 1000 (see FIG. 1) may sense the input by the pen PN even when it does not include a digitizer. Therefore, because it is not necessary to add the digitizer for sensing the pen PN, an increase in a thickness, an increase in a weight, and a decrease in flexibility of the electronic device 1000 resulting from the addition of the digitizer may not occur.

Figure 20:
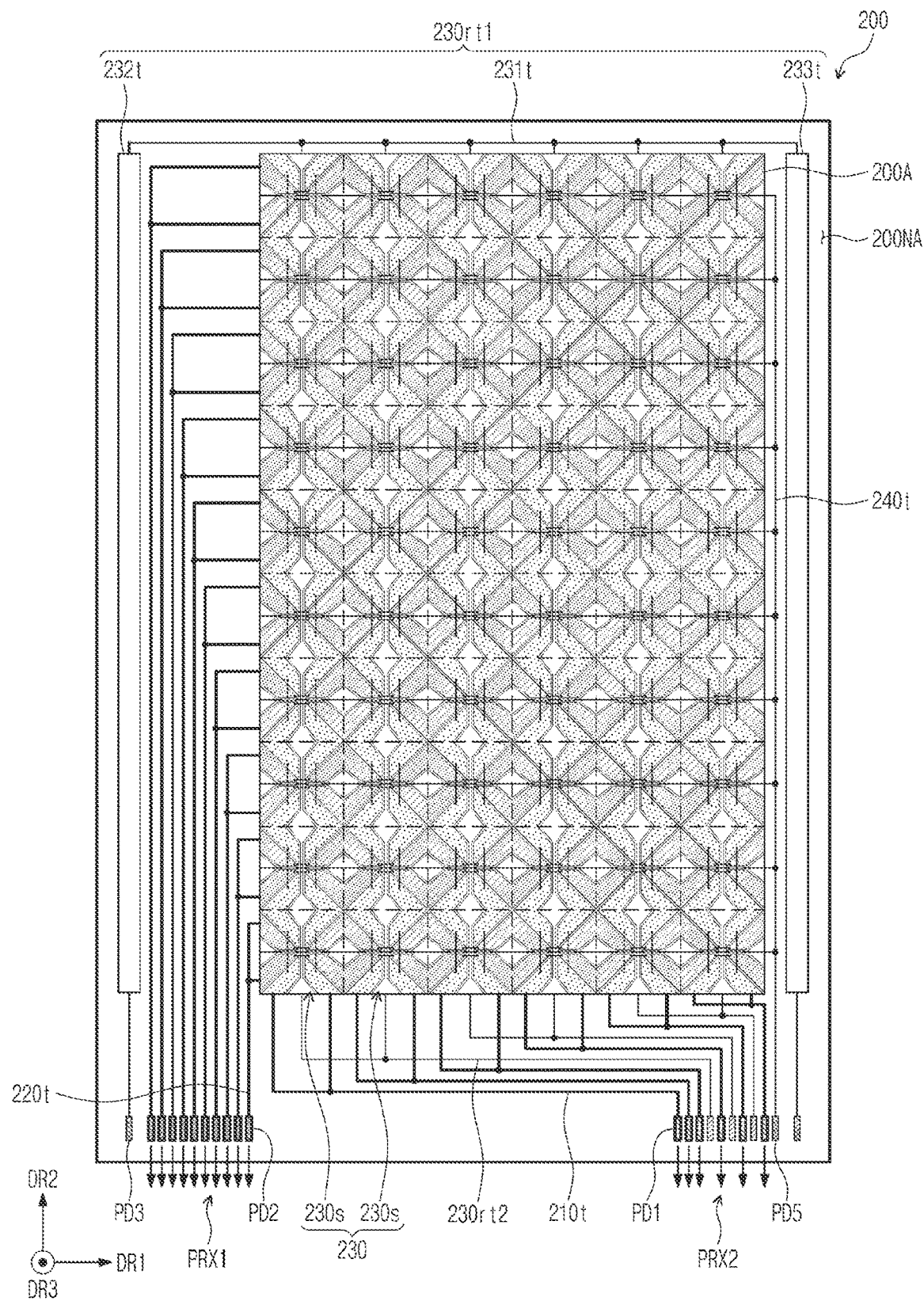
FIG. 20 is a diagram for illustrating a third mode according to an embodiment of the present disclosure.
Figure 21:
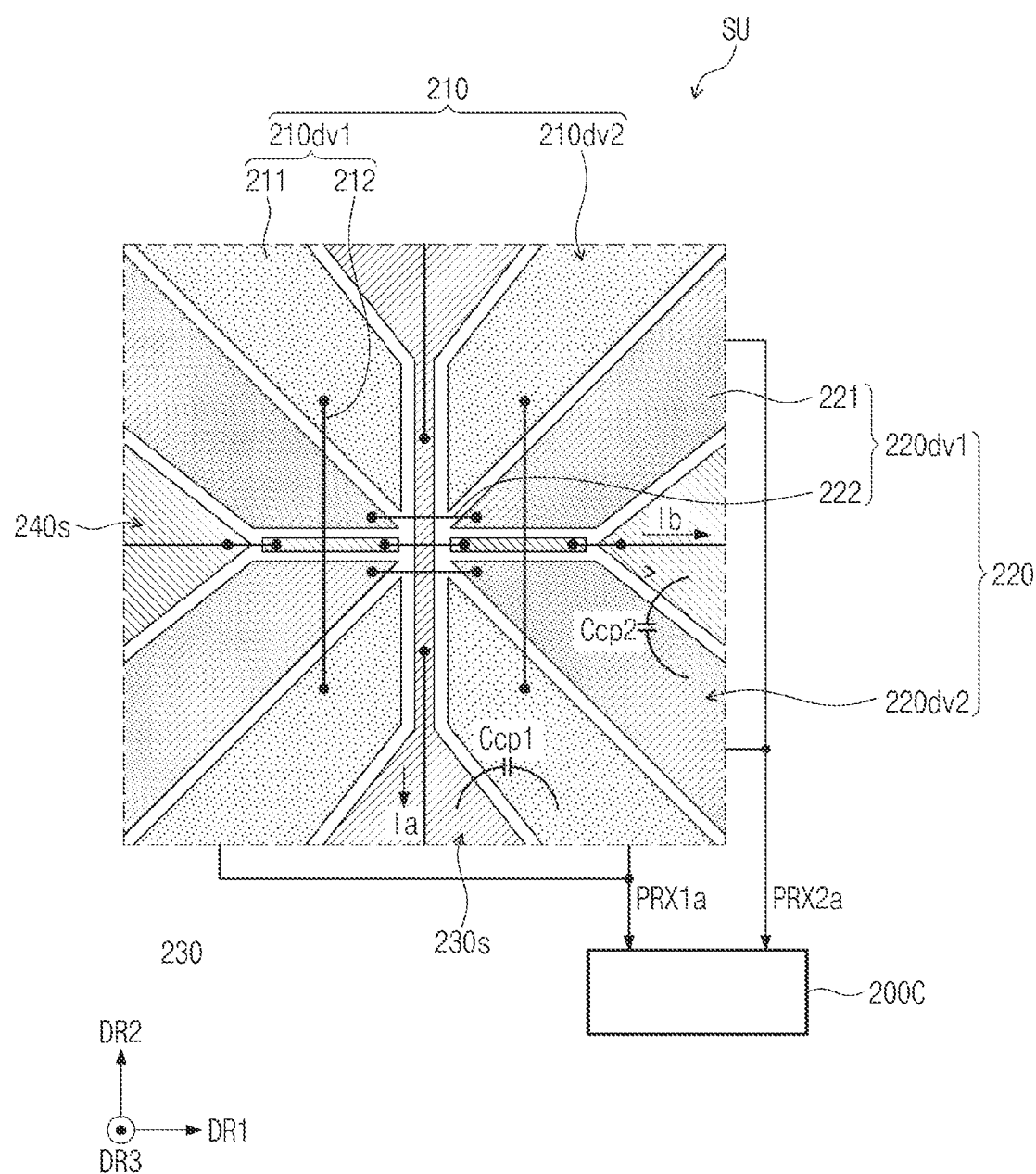
FIG. 21 is a diagram for illustrating a third mode according to an embodiment of the present disclosure.

FIG. 20 is a diagram for illustrating a third mode according to an embodiment of the present disclosure. FIG. 21 is a diagram for illustrating a third mode according to an embodiment of the present disclosure.

Referring to FIGS. 4, 20, and 21, the third mode may be referred to as a pen PN sensing mode. FIG. 21 shows one sensing unit SU through which first and second induced currents Ia and Ib generated by the pen PN flow.

In an embodiment of the third mode, the sensor driver 200C receives a first reception signal PRX1 from the first electrodes 210 and receives a second reception signal PRX2 from the second electrodes 220. In this regard, the third electrodes 230 and the fourth electrodes 240 may be grounded or applied with the constant voltage.

The LC resonance circuit of the pen PN may emit a magnetic field at a resonance frequency while discharging charged charges. The first induced current Ia may be generated in the first sub-electrode 230s of the third electrode 230 by the magnetic field provided by the pen PN, and the second induced current Ib may also be generated in the second sub-electrode 240s of the fourth electrode 240. A first coupling capacitor Ccp1 may be formed between the third electrode 230 and the first electrode 210, and a second coupling capacitor Ccp2 may be formed between the fourth electrode 240 and the second electrode 220. The first induced current Ia may be transferred to the first electrode 210 via the first coupling capacitor Ccp1, and the second induced current Ib may be transferred to the second electrode 220 via the second coupling capacitor Ccp2.

The sensor driver 200C may receive a first reception signal PRX1a based on the first induced current Ia from the first electrode 210 and receive a second reception signal PRX2a based on the second induced current Ib from the second electrode 220. The sensor driver 200C may detect input coordinates of the pen PN based on the first reception signal PRX1a and the second reception signal PRX2a.

According to at least one embodiment described above, a current path of a loop coil pattern may be implemented by components included in a sensor layer of the electronic device. The electronic device may sense an input by a pen even when it does not include a digitizer. Therefore, because it is not necessary to add the digitizer for sensing the pen, an increase in a thickness, an increase in a weight, and a decrease in flexibility of the electronic device resulting from the addition of the digitizer may not occur.

In addition, the sensor layer may include a first electrode, a second electrode, a third electrode, and a fourth electrode, the third electrode may include first sub-electrodes connected in parallel with each other, and the fourth electrode may include second sub-electrodes connected in parallel with each other. Accordingly, an effect of increasing an area size of each of the third electrode and the fourth electrode may occur, and thus, a coupling capacitance between the first electrode and the third electrode and a coupling capacitance between the second electrode and the fourth electrode may increase. Accordingly, a sensing sensitivity for sensing the pen may be increased.

Although the description refers to various embodiments, those skilled in the art will understand that the present disclosure may be modified and changed in various ways without departing from the spirit and region of the present disclosure. Therefore, the technical scope of the present disclosure should not be limited to the contents described in the detailed description of the present document.

What is claimed is:

1. An electronic device for sensing a touch, the electronic device comprising:
a plurality of first electrodes arranged along a first direction and extending along a second direction intersecting the first direction;
a plurality of second electrodes arranged along the second direction and extending along the first direction;
a plurality of third electrodes arranged along the first direction and extending along the second direction;
a fourth electrode including a plurality of sub-electrodes arranged along the second direction, extending along the first direction, and connected in parallel with each other;
a first loop trace line electrically connected to all of the plurality of third electrodes; and
a trace line electrically connected to the fourth electrode and connected to one end of each of the plurality of sub-electrodes,
wherein each of the plurality of first electrodes intersect the plurality of second electrodes.

2. The electronic device of claim 1, wherein each of the plurality of third electrodes includes a plurality of first sub-electrodes connected in parallel with each other.

3. The electronic device of claim 2, wherein the number of the plurality of first electrodes is equal to a product of the number of the plurality of first sub-electrodes included in each of the plurality of third electrodes and the number of the plurality of third electrodes.

4. The electronic device of claim 2, further comprising:
a second loop trace line including a connection line portion for connecting the plurality of first sub-electrodes to each other.

5. The electronic device of claim 4, wherein a first end of each of the plurality of first sub-electrodes is connected to the first loop trace line, and a second end spaced apart from the first end of each of the plurality of first sub-electrodes in the second direction is connected to the connection line portion.

6. The electronic device of claim 4, further comprising:
a plurality of first trace lines electrically connected to the plurality of first electrodes in a one-to-one correspondence; and
a plurality of second trace lines electrically connected to the plurality of second electrodes in a one-to-one correspondence, wherein the second loop trace line overlaps at least one of the plurality of first trace lines.

7. The electronic device of claim 6, wherein a first portion of one of the plurality of first trace lines and a second portion of the connection line portion of the second loop trace line overlap each other on a plane, and the first portion and the second portion are disposed on different layers.

8. The electronic device of claim 6, wherein at least a portion of each of the plurality of first trace lines, the plurality of second trace lines, the first loop trace line, and the second loop trace line has a multi-layer structure.

9. The electronic device of claim 6, wherein each of the plurality of first trace lines includes a plurality of branches, and the plurality of branches are electrically connected to one corresponding first electrode among the plurality of first electrodes.

10. The electronic device of claim 9, wherein each of the plurality of first electrodes extends along the second direction and includes a plurality of split electrodes spaced apart from each other in the first direction, and the plurality of branches are electrically connected to the plurality of split electrodes.

11. The electronic device of claim 1, wherein the first loop trace line comprises:
- a first line portion extending along the first direction and electrically connected to the plurality of third electrodes;
- a second line portion extending from a first end of the first line portion along the second direction; and
- a third line portion extending from a second end of the first line portion along the second direction.

12. The electronic device of claim 11, wherein each of a resistance of the second line portion and a resistance of the third line portion is equal to a resistance of one of the plurality of third electrodes.

13. The electronic device of claim 1, wherein the number of the plurality of first electrodes is greater than the number of the plurality of third electrodes.

14. The electronic device of claim 1, wherein the number of the plurality of sub-electrodes is equal to or smaller than the number of the plurality of second electrodes.

15. The electronic device of claim 1, wherein the fourth electrode is provided in plural to form a plurality of fourth electrodes, and the trace line is provided in plural to form a plurality of trace lines, wherein each of the plurality of trace lines is connected to one end of each of the plurality of sub-electrodes included in a corresponding fourth electrode among the plurality of fourth electrodes.

16. The electronic device of claim 1, further comprising:
- a sensor driver circuit electrically connected to the plurality of first electrodes, the plurality of second electrodes, the plurality of third electrodes, and the fourth electrode, wherein, in a first mode, the sensor driver circuit sequentially provides a transmission signal to the plurality of first electrodes, receives a reception signal from the plurality of second electrodes, and measures coordinates of a first input from the reception signal, wherein, in a second mode, the sensor driver circuit provides a current to a coil formed at least one of a portion of the first loop trace line and the plurality of third electrodes, wherein, in a third mode, the sensor driver circuit measures a current flowing to the plurality of first electrodes and the plurality of second electrodes to measure coordinates of a second input.

17. An electronic device for sensing a touch, the electronic device comprising:
- a plurality of first electrodes arranged along a first direction and extending along a second direction intersecting the first direction;
- a plurality of second electrodes arranged along the second direction and extending along the first direction;
- a plurality of third electrodes arranged along the first direction and extending along the second direction, wherein each of the plurality of third electrodes includes a plurality of first sub-electrodes connected in parallel with each other;
- a fourth electrode extending along the first direction; and
- a first loop trace line including a first line portion extending along the first direction and electrically connected to all of the plurality of third electrodes, a second line portion extending along the second direction from a first end of the first line portion, and a third line portion extending along the second direction from a second end of the first line portion,
- wherein each of the plurality of first electrodes intersect the plurality of second electrodes.

18. The electronic device of claim 17, wherein each of a resistance of the second line portion and a resistance of the third line portion is equal to a resistance of one of the plurality of third electrodes.

19. The electronic device of claim 17, further comprising:
- a second loop trace line including a connection line portion for connecting the plurality of first sub-electrodes to each other.

20. The electronic device of claim 19, further comprising:
- a plurality of first trace lines electrically connected to the plurality of first electrodes in a one-to-one correspondence; and
- a plurality of second trace lines electrically connected to the plurality of second electrodes in a one-to-one correspondence, wherein the second loop trace line overlaps at least one of the plurality of first trace lines.

21. The electronic device of claim 20, wherein a first portion of the at least one first trace line and a second portion of the connection line portion of the second loop trace line overlap each other on a plane, and the first portion and the second portion are disposed on different layers.

22. The electronic device of claim 20, wherein each of the plurality of first trace lines includes a plurality of branches, and the plurality of branches are electrically connected to one corresponding first electrode among the plurality of first electrodes.

23. The electronic device of claim 17, further comprising:
- a trace line electrically connected to the fourth electrode, wherein the fourth electrode includes a plurality of second sub-electrodes arranged in the second direction, extending along the first direction, and connected in parallel with each other, and wherein the trace line is connected to one end of each of the plurality of second sub-electrodes.

24. The electronic device of claim 17, wherein the fourth electrode is provided in plural to form a plurality of fourth electrodes, and the electronic device further includes a plurality of trace lines electrically connected to each of the plurality of fourth electrodes, respectively, wherein the plurality of fourth electrodes are arranged along the second direction and extend along the first direction, and each of the plurality of fourth electrodes includes a plurality of second sub-electrodes connected in parallel with each other, and wherein each of the plurality of trace lines is connected to one end of each of the plurality of second sub-electrodes included in a corresponding fourth electrode among the plurality of fourth electrodes.

25. An electronic device for sensing a touch, the electronic device comprising:
- a plurality of first electrodes arranged along a first direction and extending along a second direction intersecting the first direction;
- a plurality of second electrodes arranged along the second direction and extending along the first direction;
- a plurality of third electrodes arranged along the first direction and extending along the second direction;
- a fourth electrode extending along the first direction; and
- a first loop trace line including a first line portion extending along the first direction and electrically connected to the plurality of third electrodes, a second line portion extending along the second direction from a first end of the first line portion, and a third line portion extending along the second direction from a second end of the first line portion,
- wherein each of a resistance of the second line portion and a resistance of the third line portion is equal to a resistance of one of the plurality of third electrodes.

26. The electronic device of claim 25, wherein each of the plurality of third electrodes includes a plurality of first sub-electrodes connected in parallel with each other, wherein the fourth electrode includes a plurality of second sub-electrodes connected in parallel with each other.

27. The electronic device of claim 26, further comprising: a second loop trace line including a connection line portion for connecting the plurality of first sub-electrodes to each other.

28. The electronic device of claim 27, further comprising:
a plurality of first trace lines electrically connected to the plurality of first electrodes in a one-to-one correspondence; and a plurality of second trace lines electrically connected to the plurality of second electrodes in a one-to-one correspondence, wherein the second loop trace line overlaps at least one of the plurality of first trace lines.

* * * * *